United States Patent
Nair et al.

(10) Patent No.: US 12,462,251 B2
(45) Date of Patent: Nov. 4, 2025

(54) AUTOMATIC MODIFICATION OF TRANSACTION CONSTRAINTS

(71) Applicants: ORACLE FINANCIAL SERVICES SOFTWARE LIMITED, Mumbai (IN); Oracle International Corporation, Redwood Shores, CA (US)

(72) Inventors: Govind Gopinathan Nair, Jersey City, NJ (US); Mohini Shrivastava, Bhopal (IN); Saurabh Arora, Athens, GA (US); Jason P. Somrak, North Royalton, OH (US)

(73) Assignees: Oracle International Corporation, Redwood Shores, CA (US); Oracle Financial Services Software Limited, Mumbai (IN)

( * ) Notice: Subject to any disclaimer, the term of this patent is extended or adjusted under 35 U.S.C. 154(b) by 187 days.

(21) Appl. No.: 17/837,188

(22) Filed: Jun. 10, 2022

(65) Prior Publication Data

US 2023/0401578 A1    Dec. 14, 2023

(51) Int. Cl.
*G06Q 20/40* (2012.01)
*G06F 18/21* (2023.01)
*G06N 20/00* (2019.01)

(52) U.S. Cl.
CPC ......... *G06Q 20/401* (2013.01); *G06F 18/217* (2023.01); *G06N 20/00* (2019.01); *G06Q 20/405* (2013.01)

(58) Field of Classification Search
CPC .... G06Q 20/401; G06Q 20/405; G06N 20/00; G06F 18/217
See application file for complete search history.

(56) References Cited

U.S. PATENT DOCUMENTS

| 10,482,464 B1 * | 11/2019 | Dietrich | G06Q 20/4016 |
| 11,055,717 B2 * | 7/2021 | Cai | G06F 18/217 |

(Continued)

FOREIGN PATENT DOCUMENTS

| GB | 2581523 A | 8/2020 | |
| WO | WO-2012082935 A2 * | 6/2012 | G06Q 20/4016 |

OTHER PUBLICATIONS

A. Mead, T. Lewris, S. Prasanth, S. Adams, P. Alonzi and P. Beling, "Detecting fraud in adversarial environments: A reinforcement learning approach," 2018 Systems and Information Engineering Design Symposium (SIEDS), Charlottesville, VA, USA, 2018, pp. 118-122.*

(Continued)

*Primary Examiner* — Steven S Kim
(74) *Attorney, Agent, or Firm* — Kraguljac Law Group LLC

(57) ABSTRACT

Systems, methods, and other embodiments associated with automatic transaction constraint modification are described herein. In one embodiment, a method includes recording transactions by a reinforcement learning agent during attempts to evade one or more scenarios of a monitoring system. A usage frequency is determined for a product in a subset of the attempts to evade the one or more scenarios that are successful. The usage frequency is then compared to an expected usage frequency for the product. A transaction constraint on the product is then automatically modified to cause the usage frequency to be at or below the expected usage frequency.

20 Claims, 11 Drawing Sheets

(56) References Cited

U.S. PATENT DOCUMENTS

| | | | | |
|---|---|---|---|---|
| 2015/0379426 | A1* | 12/2015 | Steele | G06N 5/025 706/12 |
| 2016/0071017 | A1* | 3/2016 | Adjaoute | G06Q 20/4016 706/52 |
| 2017/0270534 | A1 | 9/2017 | Zoldi et al. | |
| 2018/0053188 | A1* | 2/2018 | Zoldi | G06Q 20/102 |
| 2019/0081980 | A1* | 3/2019 | Luo | G06N 20/00 |
| 2019/0378050 | A1* | 12/2019 | Edkin | G06N 20/20 |
| 2020/0334679 | A1* | 10/2020 | Sandepudi | G06Q 20/4016 |
| 2021/0064915 | A1* | 3/2021 | Wachi | G06N 3/006 |
| 2021/0081948 | A1* | 3/2021 | Kala | G06N 20/20 |
| 2022/0076264 | A1* | 3/2022 | Weinflash | H04L 9/0825 |
| 2022/0383321 | A1* | 12/2022 | Nguyen | G06Q 20/405 |
| 2023/0083724 | A1* | 3/2023 | Cella | G06F 16/182 705/28 |
| 2023/0206329 | A1* | 6/2023 | Cella | G06Q 20/3674 |
| 2023/0281504 | A1* | 9/2023 | Nair | G06N 20/00 706/12 |
| 2023/0297415 | A1* | 9/2023 | Majewski | G06F 9/4843 718/100 |
| 2023/0367690 | A1* | 11/2023 | Nair | G06F 11/327 |
| 2023/0376961 | A1* | 11/2023 | Nair | G06Q 20/382 |
| 2023/0419167 | A1* | 12/2023 | Nair | G06N 3/006 |
| 2024/0135382 | A1* | 4/2024 | Nair | G06N 20/00 |

OTHER PUBLICATIONS

Borrajo et al., Simulating and Classifying Behavior in Adversarial Environments Based on Action-State Traces: An Application to Money Laundering; Nov. 4, 2020; pp. 1-20; J. P. Morgan AI Research, New York, NY.

MIT (Massachusetts Institute of Technology; 6.825 Techniques in Artificial Intelligence, Markov Decision Processes; pp. 1-65, downloaded on Feb. 10, 2022 from: https://ocw.mit.edu/courses/electrical-engineering-and-computer-science/6-825-techniques-in-artificial-intelligence-sma-5504-fall-2002/lecture-notes/Lecture20FinalPart1.pdf.

Openai; Getting Started With Gym; pp. 1-8; downloaded from: https://gym.openai.com/docs/ on Jan. 10, 2022.

Openai; OpenAi Gym Tutorial—Artificial Intelligence Research; pp. 1-7; downloaded on Jan. 20, 2022 from https://ai-mrkogao.github.io/reinforcement%learning/openaigymtutorial/.

United States Patent and Trademark Office, Non-Final Office Action issued in co-pending U.S. Appl. No. 18/082,618 having a Date of Mailing of Mar. 14, 2025 (23 pgs).

Katrina Wakefield, "A Guide to Machine Learning Algorithms and Their Applications", Oct. 30, 2020 via Wayback Machine, https://www.sas.com/en_ie/insights/articles/analytics/machine-learning-algorithms.html (Year: 2020).

* cited by examiner

AUTOMATIC MODIFICATION OF TRANSACTION CONSTRAINTS

FIELD

This specification generally relates to artificial intelligence type computers digital data processing systems and corresponding data processing methods and products for emulation of intelligence, including adaptive systems that continually adjust rules and machine learning systems that automatically add to current integrated collections of facts and relationships, in order to measure, calibrate, or test the effectiveness of a monitoring system. More particularly, this specification generally relates to an adversarial reinforcement learning agent to measure, calibrate, and test the effectiveness of transaction monitoring systems.

BACKGROUND

Transaction monitoring systems may be implemented to evaluate transactions with deterministic rules or models called scenarios that detect known forms of suspicious activity. These rule-based models may be evaluated and improved through simple below-the-line testing. An overall transaction monitoring system can include multiple scenarios.

The quality of a scenario is currently evaluated entirely based on whether the alerts created by a scenario lead to effective cases and suspicious activity reports (SARs) downstream. This approach does not accurately measure the value of a scenario or rule in identifying suspicious activity. Often, a SAR is filed for a reason unrelated to an alert triggered in a scenario or rule. At other times, multiple alerts lead to a single case of suspicious activity and it is unclear which alert or scenario should be credited for the effective case.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems, methods, and other embodiments are described herein that provide for automatic modification of a transaction constraint. In one embodiment, a constraint modification system determines that a product can be used more often than expected to circumvent a monitoring system, and then modifies transaction constraints on the product to reduce use of the product to circumvent the monitoring system. In one embodiment, the extent to which a product can be used to circumvent the monitoring system may be measured by how often an adversarial reinforcement learning (RL) agent uses the products to circumvent the monitoring system.

In one embodiment, products such as transaction channels or account types in transaction systems are subject to transaction constraints that restrict actions using the product. In one embodiment, a record of the RL agent transactions may be examined by the constraint modification system to determine a usage frequency for the product. The usage frequency indicates how often the RL agent uses a particular product to successfully evade scenarios without triggering alerts. The usage frequency provides a proxy metric for a level of weakness or susceptibility of the product to illicit use. In one embodiment, where the usage frequency indicates that the product is used to evade scenarios more often than expected, the constraint modification system may automatically modify transaction constraints on the product to increase resistance of the product to illicit use. This causes usage frequency to fall within expected levels. In one embodiment, the automatic modification includes recommendation of modifications to the transaction constraints. In one embodiment, the automatic modification includes deployment of transaction constraints that have been modified as recommended.

The constraint modification system and its components are one example implementation of a reinforcement learning agent for evaluation of monitoring systems, as shown and described herein in further detail. In one embodiment, the components of constraint modification system are those of system 200 (as shown and described with reference to FIG. 2) or architecture 300 (as shown and described with reference to FIG. 3), configured to facilitate automatic transaction constraint modification methods and logic as shown and described herein. In one embodiment, constraint modification system is configured to execute an example method 100 for automatic transaction constraint modification, as shown and described with reference to FIG. 1.

No action or function described or claimed herein is performed by the human mind. An interpretation that any action or function can be performed in the human mind is inconsistent with and contrary to this disclosure.

—Example Method for Automatic Transaction Constraint Modification—

Figure 1:
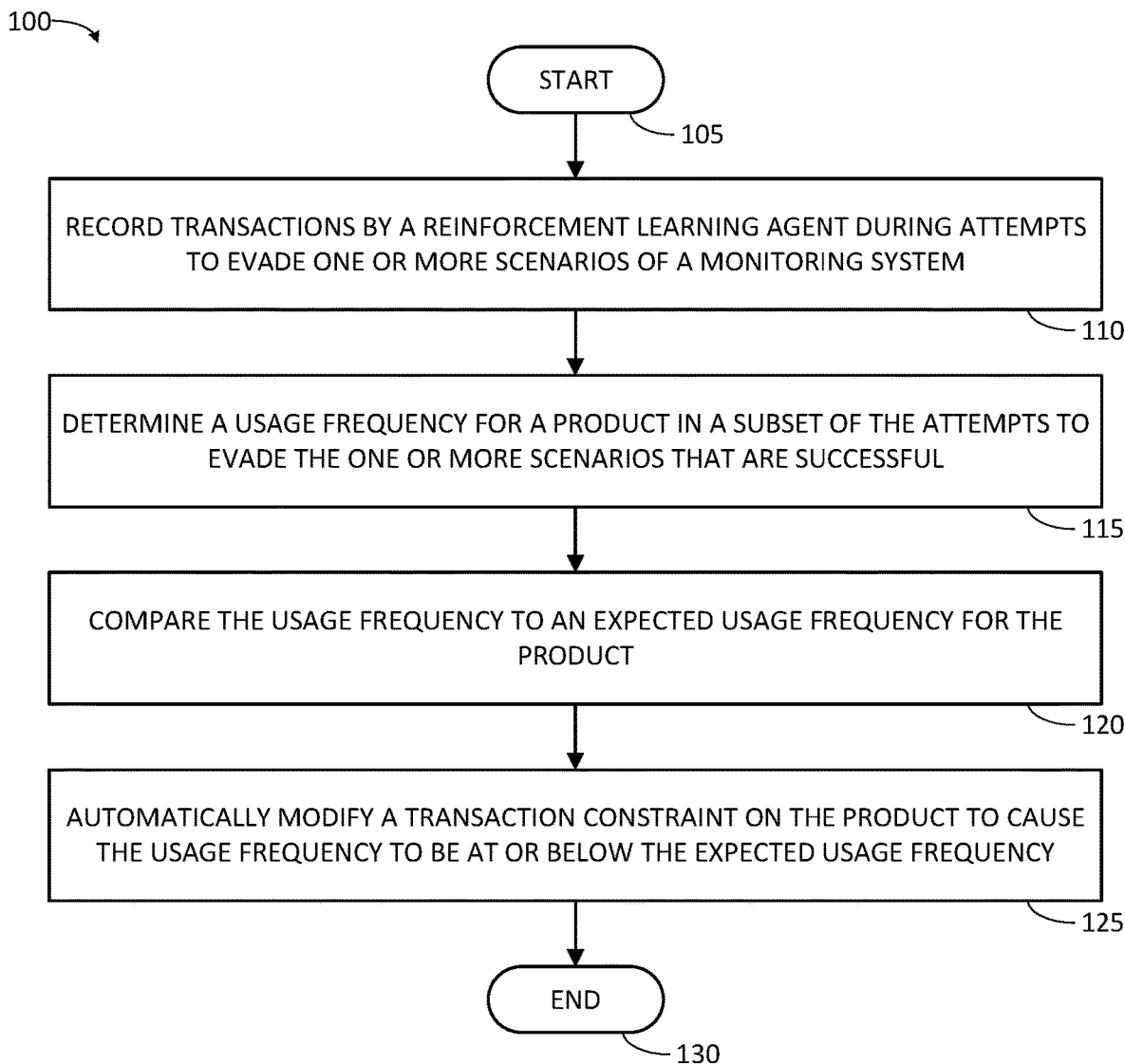
FIG. 1 illustrates one embodiment of a method associated with automatic transaction constraint modification.

FIG. 1 illustrates one embodiment of a method 100 associated with automatic transaction constraint modification. In one embodiment, a constraint modification system records transactions performed by an RL agent during attempts to evade scenarios of a monitoring system. In one embodiment, the constraint modification system determines a usage frequency for a product in those attempts to evade the scenarios that are successful attempts. In one embodiment, the constraint modification system compares the usage frequency to an expected usage frequency for the product. In one embodiment, the constraint modification system automatically modifies a transaction constraint on the product to cause the usage frequency to be at or below the expected usage frequency.

Figure 2:
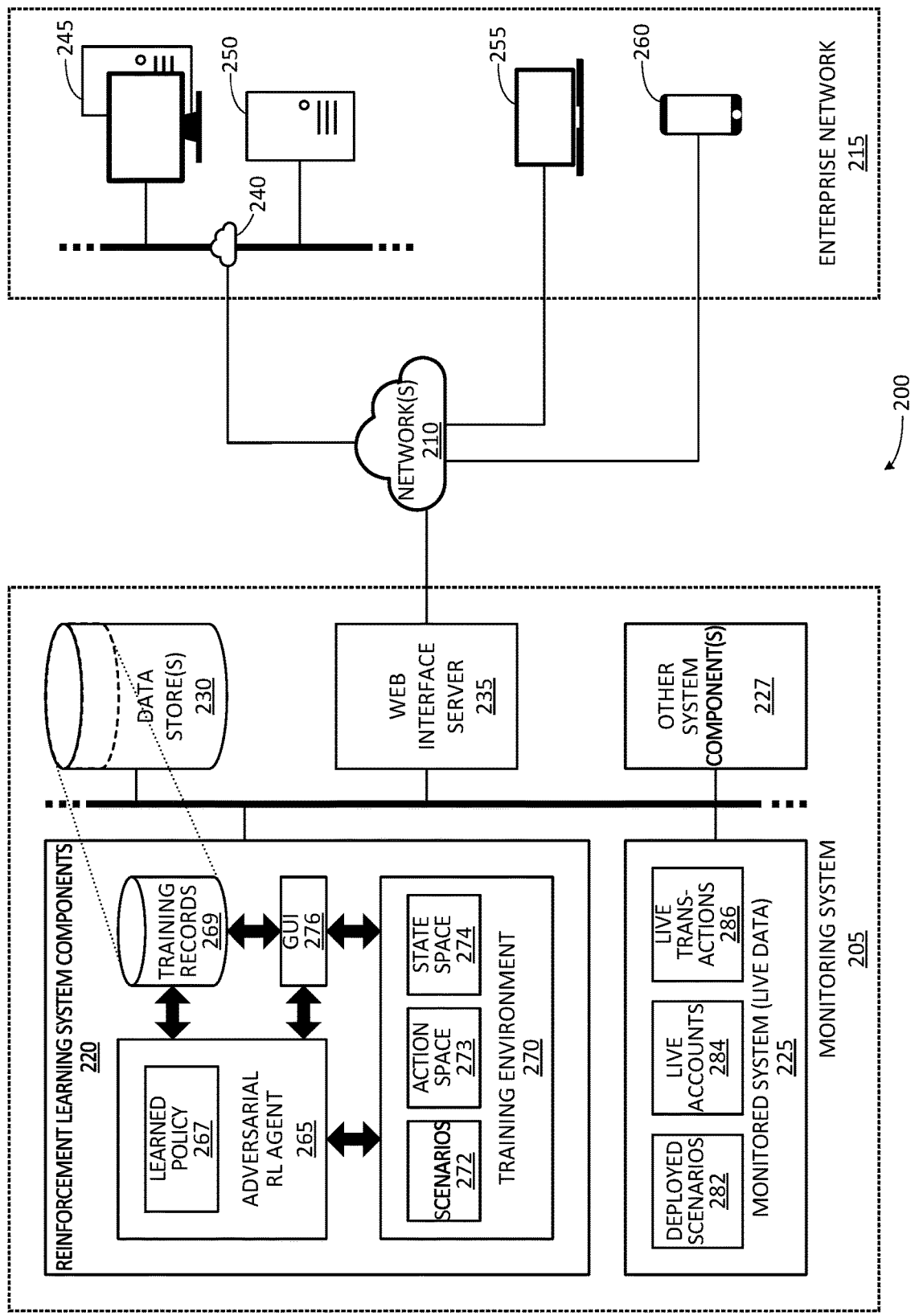
FIG. 2 illustrates one embodiment of a system associated with a reinforcement learning agent for evaluation of monitoring systems.

In one embodiment, this constraint modification method 100 is implemented and performed by monitoring system 205 of FIG. 2 operating as a constraint modification system. In one embodiment, constraint modification method 100 initiates at START block 105 in response to a processor determining one or more of: (i) that a number of transactions prevented by a transaction constraint has exceeded a threshold indicating that the transaction constraint may need to be adjusted; (ii) that a user or administrator of a monitoring system has initiated constraint modification method 100; (iii) that constraint modification method 100 is scheduled to be performed at a particular time; and (iv) that constraint modification method 100 should commence in response to occurrence of some other condition. Processing continues to process block 110.

At process block 110, the processor records transactions by a reinforcement learning agent during attempts to evade one or more scenarios of a monitoring system.

In one embodiment, the RL agent is configured to perform transactions using one or more products in a monitored system in order to complete a task. In one embodiment, the RL agent is adversarial, and is being or has been trained to choose transactions in furtherance of a task or goal in a transaction system monitored by scenarios which are configured to inhibit, hinder, prevent, or otherwise thwart the task. In one embodiment, the RL agent is trained over a series of episodes to complete the task without triggering the scenarios of a monitoring system. In one embodiment, the RL agent is configured to attempt to evade the scenarios by performing alternative transactions in response to discovering actions that trigger a scenario alert.

In one embodiment, an RL agent evades a scenario when the RL agent performs a transaction in furtherance of the task without triggering or causing an alert under the scenario. Thus, in one embodiment, an attempt to evade scenarios of the monitoring system may be one or more transactions by the RL agent. In one embodiment, an attempt is successful where the RL agent performs a transaction in furtherance of the task without triggering an alert. In one embodiment, an attempt is unsuccessful where the RL agent performs a transaction in furtherance of the task that triggers an alert.

In one embodiment, the series of transactions to complete the task (or reach a cap on time or transactions) may also be referred to as an episode. An episode may be recorded as a data structure that includes data structures or entries for individual transactions. The data structure for an individual transaction includes a transaction value (such as an amount), an identifier for a source account for the transaction, an identifier for a destination account for the transaction, a type of transaction channel for effecting the transaction between the source account and destination account, along with alert/no alert statuses for the scenarios following the transaction.

In one embodiment, the individual transactions may further describe the types of the source and destination accounts used in the transaction. Or, in one embodiment, the types of source and destination accounts may be derived from the accounts themselves, for example by looking up an identifier for the account and retrieving associated account type information. These types—type of source and destination accounts and type of transaction channel—are products. These products are discussed more fully herein below, for example in in the context of an action space for the RL agent, an example training run, and addition of a new channel or product.

In one embodiment, one of the ways that transaction constraints differ from scenarios is that transaction constraints define improper or invalid actions that will not be executed, while scenarios define conditions under which an alert will be triggered. In one embodiment, where a transaction violates a transaction constraint, the transaction will be stopped, prevented, or otherwise not put into effect, but the transaction may or may not satisfy a scenario that will trigger an alert. In one embodiment, a state of source account and destination account immediately following a transaction that violates a transaction constraint is a same state as immediately preceding the transaction.

The RL agent may be executed for one or more episodes. In one embodiment, as the RL agent proceeds through an episode, the processor records the transactions performed by the RL agent as transaction data structures in an episode data structure. The processor evaluates whether one or more scenarios of the monitoring system were triggered by the transaction. The processor records the resulting states of alert or no alert for the one or more scenarios in the transaction data structure for the transaction. For example, a table may be created for the episode, and a row may be placed into the table or other data structure for each transaction and its resulting scenario alert states. Thus, one or more RL agent executed transactions that attempt to evade the scenarios are recorded alongside information as to whether or not the attempt was successful.

Process block 110 then completes, and processing continues at process block 115. In one embodiment, at the completion of process block 110, the episode and transaction (or action) data structures form a record of the product types (account types and transaction channels) used during attempts to evade scenarios alongside a record of success or failure of the attempts. This record may be parsed to extract information that relates product type with outcome of attempt.

At process block 115, the processor determines a usage frequency for a product in a subset of the attempts to evade the one or more scenarios that are successful. In one embodiment, the usage frequency is a measure of how often the RL agent uses a particular product to successfully evade scenarios without triggering alerts. In one embodiment, the processor parses the record of the transactions created in process block 110 to count a number of transactions that (i) involve a particular product and (ii) do not trigger an alert. For example, the processor may count a number of transactions performed using a cash transaction channel (one particular product), and that do not trigger an alert under any of the scenarios. In one embodiment, the number of non-alert transactions for a particular product forms a basis for the usage frequency.

In one embodiment, use of one type of product is measured relative to use of other types of product. Therefore, in one embodiment, the usage frequency is expressed as a percentage (or other ratio) of overall usage of a set of products. In one embodiment, the set of products is selected from the types of product that are used or enabled in the monitored system. In one embodiment, the set of products are limited to products of the same class as the particular product for which the usage frequency is being determined. In one embodiment, products may be categorized by classes representing similar functionality. For example, in one embodiment, transaction channels are one class of product, and account types are another class of product.

In one embodiment, the usage frequency of a product is expressed as a percentage (or other ratio) of the overall number of non-alert transactions that use products of that class. For example, the usage frequency of a given transaction channel, such as cash, is the ratio of cash transactions that did not trigger an alert to all transactions (regardless of transaction channel) that did not trigger an alert. In another example, the usage frequency of a given account type, such as checking, is the ratio of transactions involving a checking account that did not trigger an alert to all transactions (regardless of account type) that did not trigger an alert. In one embodiment, performing the usage frequency analysis on those transactions which do not trigger alerts identifies the usage frequency in the subset of the attempts to evade the one or more scenarios that are successful.

In one embodiment, the usage frequency is the ratio of the transactions involving a particular product to an overall number of transactions. In one embodiment, the transactions are limited to those in which no alert is triggered, and do not include the transactions for which an alert is triggered. In one embodiment, the overall number of transactions is all transactions. In one embodiment, the overall number of transactions is transactions involving the same class of product as the particular product. For example, in one embodiment, the particular product is a wire transactions transaction channel, and the class of product is all transaction channels. In this example, the usage frequency would be the ratio of wire transfers to transactions using any transaction channel, where no transactions trigger an alert. In one embodiment, transactions using any transaction channel includes all transactions. In another example, where the particular product is a checking account account type, and the class of product is all account types. In this example, the usage frequency is the ratio among those transactions that do not trigger an alert of transactions involving a checking account to transactions involving any type of account. In one embodiment, transactions involving any type of account includes all transactions.

In one embodiment, the processor parses the record of the transactions created in process block 110 to count a number of transactions that (i) involve a particular product and (ii) do not trigger an alert, as discussed above. The processor further parses the record of the transactions created in process block 110 to count an overall or total number of transactions that did not trigger an alert under the scenarios. The processor then divides the number of transactions that (i) involve a particular product and (ii) do not trigger an alert by the overall or total number of transactions that did not trigger an alert. In one embodiment, the resulting ratio is the usage frequency of the particular product in evading scenarios.

Process block 115 then completes, and processing continues at process block 120. In one embodiment, a usage frequency for the product in evading scenarios is determined. In one embodiment, the usage frequency thus provides a quantification of the relative utility of the product for evading the scenarios among other products of its type. In one embodiment, the usage frequency can then be evaluated to determine whether the product is more useful than expected for evading the scenarios and performing illicit actions.

At process block 120, the processor compares the usage frequency to an expected usage frequency for the product. In one embodiment, the processor retrieves an expected usage frequency for the product from storage. In one embodiment, the expected usage frequency for the product is pre-determined before execution of process block 120. In one embodiment, the expected usage frequency for the product is determined based on actual, observed usage of the product, for example, as observed in a live data, monitored system. In one embodiment, the expected usage frequency for the product is an actual, observed usage of the product to perform transactions in the monitored system.

For example, in one embodiment, the expected usage frequency is a ratio of transactions performed using the product to all transactions performed. For example, in one embodiment, the expected usage frequency is calculated from observed data over a window of time, for example, one month, or one year. Thus, in one embodiment, the expected usage frequency is a number of actual uses of the product to perform transactions within a window of time divided by a number of actual transactions performed within the window of time. Thus, in one embodiment, the expected usage frequency provides a baseline of the proportion of ordinary use of the product within the live system, where illicit activity is presumed to be a very small proportion of the live transactions.

Thus, in one embodiment, the processor may record live transactions over the period of time. In one embodiment, the processor may parse the live transactions to identify both a number of overall live transactions during the period of time, and a number of uses of the product in live transactions to perform transactions during the period of time. In one embodiment, the processor may then divide the number of uses of the product by the number of overall transactions to find the expected usage frequency for the product.

In one embodiment, the processor then compares the usage frequency to the expected usage frequency for the product. In one embodiment, as discussed in further detail herein, the processor determines an extent to which the usage frequency exceeds the expected usage frequency. In one embodiment, based on the extent to which the usage frequency exceeds the expected usage frequency, the processor determines whether the usage frequency so exceeds the expected usage frequency as to indicate that a transaction constraint on the product should be tightened to bring the usage frequency to an expected level, as discussed in further detail herein.

Process block 120 then completes, and processing continues at process block 125. At the completion of process block 120, the processor has determined whether or not a transaction constraint should be tightened and made more restrictive based on the comparison of usage frequency and expected usage frequency for the product.

At process block 125, the processor automatically modifies a transaction constraint on the product to cause the usage frequency to be at or below the expected usage frequency. In one embodiment, the processor selects a new value for the transaction constraint that is tighter and further restricts an operation associated with the product. In one embodiment, the new value for the transaction constraint has been determined to result in a usage frequency for the product that is at or below the expected frequency. In one embodiment, as discussed below, the new value for the transaction constraint is identified by an iterative or looped process that identifies additional utilization frequencies for tighter transaction constraints. In one embodiment, in the automatic modification of the transaction constraint, the new, tightened value for the transaction constraint, is presented in a user interface for review, as discussed in further detail below. In one embodiment, in the automatic modification of the transaction constraint, the processor deploys the modified transaction constraint to a live data monitored system. In one embodiment, the processor replaces the transaction constraint on the product with the modified transaction constraint to cause the live data monitored system to Process block 125 then completes, and processing continues to END block 130, where method 110 completes. In one embodiment, the transaction constraint has been tightened to reduce the usefulness of the product for evading scenarios. Thus, the product has been strengthened against illicit use. In one embodiment, transactions that violate the transaction constraint will be stopped. In one embodiment, the illicit activity is inhibited or slowed by forcing the transactions used to evade the scenarios to conform to the tighter transaction constraint. For example, tightening a transaction constraint to reduce an amount that may be transferred through a particular transaction channel over a time period forces a transfer of a large amount to be made more slowly.

In one embodiment, the modification of the transaction constraint includes an iterative or looped process where the processor identifies the additional usage frequencies for a progressively tighter transaction constraint until a base condition is reached. In one embodiment, the iterative process includes generating a new, tightened value for the transaction constraint on the product. In one embodiment, the iterative process further includes determining an additional usage frequency for the tightened transaction constraint. In one embodiment, the iterative process includes comparing the additional usage frequency to the expected usage frequency. In one embodiment, the base condition of the iterative process is that the additional usage frequency is at or below the expected usage frequency. Once the iterative process is completed and the base case is reached, the processor modifies the transaction constraint to match the tightened transaction constraint.

In one embodiment, the processor generates a new tightened value for the transaction constraint on the product by adjusting a value of the transaction constraint so as to tighten the constraint to be less permissive. In one embodiment, the adjustment is by a uniform increment, such as a pre-selected number of units. In one embodiment, the adjustment is by a uniform ratio, such as a pre-selected percentage, for example, ten percent. Following the adjustment to the transaction constraint value, the processor then determines an additional usage frequency (in the manner discussed above for the usage frequency) for the adjusted transaction constraint value. In one embodiment, the processor then compares the additional usage frequency to the expected usage frequency to determine whether or not the additional usage frequency is at or below the expected usage frequency. If this base condition is not reached, the process repeats until the additional usage frequency is at or below the expected usage frequency. Once this base condition is reached, the associated adjustment to the transaction constraint is sufficient to bring the usage frequency to expected levels. Thus, in one embodiment, the processor then selects, as the automatic adjustment to the transaction constraint, the adjustment to the transaction constraint that results in the usage frequency falling within expected levels.

In one embodiment, in the comparison of the usage frequency to the expected usage frequency, the processor determines an extent to which the usage frequency exceeds the expected usage frequency. In one embodiment, the processor then compares the extent to a pre-selected threshold. In one embodiment, the modification of the transaction constraint on the product is then performed in response to the extent satisfying the pre-selected threshold. In one embodiment, where the extent fails to satisfy the pre-selected threshold, the modification of the transaction constraint is not performed.

In one embodiment, the processor determines an extent of difference between the usage frequency and the expected usage frequency. For example, in one embodiment, the processor calculates a relative difference between the usage frequency and the expected usage frequency. Thus, in one embodiment, processor calculates the difference between the usage frequency and the expected usage frequency, divided by the average of the usage frequency and the expected usage frequency in order to determine the relative difference.

In one embodiment, where the usage of the product by the RL agent exceeds that of the expected values, the usage should be reduced so that the delta between usage frequency and expected usage frequency is capped at some value. In one embodiment, the processor determines whether the relative difference between the usage frequency and the expected usage frequency exceeds a threshold amount. In one embodiment, the threshold amount indicates a maximum relative difference between usage frequency and expected usage frequency. In one embodiment, the threshold amount may be pre-selected, in advance of performance of method 100 by a user or administrator of the constraint modification system. In one embodiment, the pre-selected threshold is a percentage threshold or a ratio extent to which the usage frequency is permitted to exceed the expected usage frequency.

In one embodiment, where the relative difference between the usage frequency and the expected usage frequency satisfies (for example, meets or exceeds) the threshold amount, modification of a transaction constraint on the product to reduce the usage frequency is indicated. In one embodiment, the expected usage should exceed the expected usage frequency by no more than some specified value, such as a percentage. For example, the pre-selected threshold may be satisfied where the extent by which the usage frequency exceeds the expected usage frequency by more than the specified value, for example, five percent, ten percent, or more. Thus, in one embodiment, the processor compares the relative difference to the threshold amount in order to determine whether or not to automatically modify a transaction constraint on the product. In one embodiment, where the threshold is satisfied, tightening of the transaction constraint substantively strengthens the product against illicit use. In one embodiment, where the threshold is not satisfied, tightening of the transaction constraint negligibly strengthens the product against illicit use. Thus, in one embodiment, the value of the threshold is selected to differentiate between substantive and negligible improvements in product strength. In one embodiment, the value of the pre-selected threshold may differ depending on the particular type of product, or depending on the particular transaction constraint applied to the product.

In one embodiment, in the modification of the transaction constraint on the product, the processor instructs the monitoring system to apply the modified transaction constraint to live transactions or live accounts in a monitored transaction system that is monitored by the monitoring system. In one embodiment, the processor deploys the modified transaction constraint to a monitored system in which live data transactions are being performed. In one embodiment, the modified transaction constraint replaces or supersedes a prior value of the transaction constraint in the live data monitored system. Thus, in one embodiment, following the deployment, transactions that do not violate the unmodified transaction constraint and that do violate the modified transaction constraint will be stopped and not executed by the monitored system.

In one embodiment, in the modification of the transaction constraint on the product, the processor further instructs the monitoring system to apply the modified transaction constraints to live transactions or live accounts associated with a first customer segment, and to not apply the modified transaction constraints to live transactions or live accounts associated with a second customer segment. In one embodiment, this is determined from information about the accounts associated with the live transactions or from information about the live accounts. In one embodiment, an account may be associated with legitimate, non-illicit high account balances and legitimate, non-illicit large transfers. These accounts may be labeled with a flag or other data structure indicating that large balances or transfers are expected and legitimate. In one embodiment, the processor parses the accounts to determine whether the accounts are labeled as being associated with legitimate large balances or transfers. In one embodiment, the processor excludes these accounts from application of the modified transaction constraint. Thus, in one embodiment, following the deployment, transactions that violate the modified transaction constraint, and which involve these accounts labeled for legitimate large scale activity, will not be stopped due to the modified transaction constraint. Instead, transaction constraints specific to the labeled accounts will continue to be applied to transactions involving the labeled accounts.

In one embodiment, the processor determines a new usage frequency for the product following the modification of the transaction constraint. In one embodiment, the processor then presents the new usage frequency for the product in a user interface. In one embodiment, the processor presents, in the user interface, a user-selectable element to accept the modifying the transaction constraint. Then processor then accepts, in the user interface, a user selection of the element to accept the modifying. In one embodiment, the modification of the transaction constraint is performed in response to the user selection. In one embodiment, the value of the modified transaction constraint and/or information about the effect of the new usage frequency may be presented in the user interface to inform selection of the user-selectable elements. In one embodiment, the user interface is a graphical user interface or GUI, and the user-selectable elements may take the form of selectable buttons for the accept and reject modification options. In one embodiment, the user interface may display relative usage frequency between products both before and after modification of the transaction constraint. For example, this may be shown as a bar chart, for example in a manner similar to that shown and described regrading relative strengths of scenario at reference 555 herein.

In one embodiment, the product is a type of transaction channel. Amounts may be transferred from one account to another account through the transaction channel. In one embodiment, in the modification of the transaction constraint, the processor reduces a size of amount permitted to be transferred through the transaction channel in a single transaction. In one embodiment, the product is a type of account. Amounts may be transferred into or retrieved from accounts. In one embodiment, in the modification of the transaction constraint, the processor reduces a size of amount permitted to be transferred into the type of account, or out of the type of account. In one embodiment, the size of amount permitted to be transferred is an amount permitted to be transferred in a single transaction. In one embodiment, the size of amount permitted to be transferred is a cumulative amount permitted to be transferred within a period of time.

Additional detail on automatic transaction constraint modification is provided herein, for example under the heading "Automatic Modification of Transaction Constraints," and elsewhere.

—Reinforcement Learning Agent to Evaluate Monitoring Systems—

Systems, methods, and other embodiments are described herein that provide a reinforcement learning (RL) agent to evaluate monitoring system strength, for example in transaction monitoring systems. In one embodiment, a user is able to fully specify features of an environment to be monitored, including node (account or product) types, types of links (transaction or channel types) between nodes, and rules governing (or monitoring) movement across the links between nodes. An adversarial RL agent is trained in this environment to learn a most effective way to evade the rules. In one embodiment, the training is iterative exploration of the environment by the RL agent in an attempt to maximize a reward function that continues until the RL agent consistently behaves in a way that maximizes the reward function. The activity of the RL agent during training as well as the behavior of the trained agent is recorded, and used to automatically provide objective assessment of the effectiveness of the transaction monitoring system. The policy to evade the rules learned by the agent may then be used to automatically develop new governing or monitoring rule to prevent this discovered evasive movement.

For example, a user is able to fully specify the banking ecosystem of a financial institution, including account types, product types, transaction channels, and transaction monitoring rules. An RL agent acting as an artificial money launderer learns the most intelligent way or policy to move a specified amount of money from one or more source accounts within or outside a financial institution to one or more destination accounts inside or outside the financial institution. Important insights and statistics relevant to the institution may then be presented to the user. The policy to move the specified amount of money while avoiding the transaction monitoring rules may then be used to develop a rule that stymies the said policy, which can then be deployed to the banking ecosystem as a new transaction monitoring rule.

Use of the reinforcement learning agent to evaluate transaction monitoring systems as shown and described herein provides for a more comprehensive testing system that automatically reveals loopholes in the overall monitoring system that sophisticated actors could exploit. Identifying such loopholes will allow institutions to assess the seriousness of these gaps and proactively address them, for example by automatically deploying a rule or policy developed by the reinforcement learning agent as a new transaction monitoring rule. Additionally, the reinforcement learning agent to evaluate transaction monitoring systems as shown and described herein can be used to quantify the quality of a rule (whether previously implemented or newly developed) in terms of the role it plays in thwarting an adversarial agent. This can allow banks to understand the real value of a rule and make decisions around how to prioritize rules for tuning.

In one embodiment, the reinforcement learning agent to evaluate transaction monitoring systems as shown and described herein can be used in at least the following ways:

1) An institution can analyze the kind of policies learned by the agent to evade the system. If the agent has discovered a straightforward way to evade a transaction monitoring system without triggering any rules, it indicates a systemic weakness that needs to be rectified, and which may be rectified at least in part by automatically developing rules that detect policies learned by the agent, and then deploying them as rules in the transaction monitoring system.
2) Without the use of the reinforcement learning agent to evaluate the monitoring system as shown and described herein, each component of the overall monitoring system is tested separately. With the use of the reinforcement learning agent to evaluate the monitoring system as shown and described herein enables testing the overall strength of the monitoring system inclusive of all monitoring rules.
3) When introducing a new product and/or new rules to monitor the new product, an institution can add the new rules and/or the new product to the environment to identify obvious deficiencies in the monitoring system using the reinforcement learning agent before the new product is introduced to users. Without the use of the reinforcement learning agent to evaluate the monitoring system as shown and described herein, institutions need to pilot the new rules with users for an extensive period of time—for example several months—to determine if they are adequate.
4) With the use of the reinforcement learning agent to evaluate the monitoring system as shown and described herein, institutions can understand the incremental value of each rule in thwarting the agent, and by extension, in thwarting the malicious activity represented by the agent's activity (such as money laundering).

Thus, the strength of the monitoring system can be evaluated holistically and automatically improved, while maintaining understanding of the individual contributions of each rule.

In one embodiment, the systems, methods, and other embodiments described herein create an adversarial agent to evade the transaction monitoring scenarios or rules in an environment. In one embodiment, reinforcement learning is used to create the adversarial agent. In one embodiment, strength of the overall monitoring system may be quantified in terms of the performance of this adversarial agent. In one embodiment, the value of each scenario or rule in terms may be quantified in terms of the performance of this agent. The complexity of the pattern or policy to evade the rules that is identified by the agent is a proxy for the strength of the transaction monitoring system. Metrics quantifying the pattern complexity may therefore be used to quantify the overall strength of the monitoring system, for example as shown and described herein. Further, the contribution of each individual rule to the strength of the monitoring may be measured by its effectiveness in thwarting the RL agent. Metrics quantifying the extent to which each rule thwarts the RL agent may therefore be used to quantify the relative contribution of each rule to overall system strength, for example as shown and described herein.

At a high level, in one embodiment, the reinforcement learning agent systems, methods, and other embodiments to evaluate transaction monitoring systems as shown and described herein include multiple parts. In one embodiment, the systems, methods, and other embodiments include creation of a flexible environment that can accommodate an arbitrary number of rules. This environment acts as a simulator of a monitored system (such as a transaction system) that the reinforcement learning agent can interact with and get meaningful responses and/or rewards for its actions. In one embodiment, the systems, methods, and other embodiments include a reinforcement learning agent that tries and learns to evade multiple realistic rules. For example, a RL library like Ray RLLib to is used to experiment with various algorithms or patterns in environments of progressively increasing complexity. In one embodiment, the systems, methods, and other embodiments use design metrics that measure the complexity of the algorithm or pattern identified by the agent to be a proxy for the strength of the system simulated by the environment. The value of each rule in the environment is quantifiable depending on its effectiveness in thwarting the agent. Thus, measurements of the RL agent training process in the simulated system and the performance of the trained agent is used to objectively measure the strength of live system. In one embodiment, the systems, methods, and other embodiments include data visualizations, dashboards, and other tools created for business users to view results in a graphical user interface (GUI).

—Example Compute Environment—

FIG. 2 illustrates one embodiment of a system 200 associated with a reinforcement learning agent for evaluation of monitoring systems. In one embodiment, the components of system 200 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of system 200 may (i) generate or compose an electronic message or signal to issue a command or request to another component, (ii) transmit the message or signal to other components of computing system 200, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, system 200 includes a monitoring system 205 connected by the Internet 210 (or another suitable communications network or combination of networks) to an enterprise network 215. In one embodiment, monitoring system 205 includes various systems and components which include reinforcement learning system components 220, monitored system components 225, other system components 227, data store(s) 230, and web interface server 235.

Each of the components of monitoring system 205 is configured by logic to execute the functions that the component is described as performing. In one embodiment, the components of monitoring system may be implemented as sets of one or more software modules executed by one or more computing devices specially configured for such execution. In one embodiment, the components of monitoring system 205 are implemented on one or more hardware computing devices or hosts interconnected by a data network. For example, the components of monitoring system 205 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes. In one embodiment, the components of monitoring system 205 are implemented by dedicated computing devices. In one embodiment, the components of monitoring system 205 are implemented by a common (or shared) computing device, even though represented as discrete units in FIG. 2. In one embodiment, monitoring system 205 may be hosted by a dedicated third party, for example in an infrastructure-as-a-service (IAAS), platform-as-a-service (PAAS), or software-as-a-service (SAAS) architecture.

In one embodiment, remote computing systems (such as those of enterprise network 215) may access information or applications provided by monitoring system 205 through web interface server 235. In one embodiment, the remote computing system may send requests to and receive responses from web interface server 235. In one example, access to the information or applications may be effected through use of a web browser on a personal computer 245, remote user computers 255 or mobile device 260. For example, these computing devices 245, 255, 260 of the enterprise network 215 may request display of monitoring strength analysis GUIs, threshold tuning GUIs or other user interfaces, as shown and described herein. In one example, communications may be exchanged between web interface server 235 and personal computer 245, server 250, remote user computers 255 or mobile device 260, and may take the form of remote representational state transfer (REST) requests using JavaScript object notation (JSON) as the data interchange format for example, or simple object access protocol (SOAP) requests to and from XML servers. The REST or SOAP requests may include API calls to components of monitoring system 205.

Enterprise network 215 may be associated with a business. For simplicity and clarity of explanation, enterprise network 215 is represented by an on-site local area network 240 to which one or more personal computers 245, or servers 250 are operably connected, along with one or more remote user computers 255 or mobile devices 260 that are connected to enterprise network 215 through network(s) 210. Each personal computer 245, remote user computer 255, or mobile device 260 is generally dedicated to a particular end user, such as an employee or contractor associated with the business, although such dedication is not required. The personal computers 245 and remote user computers 255 can be, for example, a desktop computer, laptop computer, tablet computer, or other device having the ability to connect to local area network 240 or Internet 210. Mobile device 260 can be, for example, a smartphone, tablet computer, mobile phone, or other device having the ability to connect to local area network 240 or network(s) 210 through wireless networks, such as cellular telephone networks or Wi-Fi. Users of the enterprise network 215 interface with monitoring system 205 across network(s) 210.

In one embodiment, data store 230 is a computing stack for the structured storage and retrieval of one or more collections of information or data in non-transitory computer-readable media, for example as one or more data structures. In one embodiment, data store 230 includes one or more databases configured to store and serve information used by monitoring system 205. In one embodiment, data store 260 includes one or more account databases configured to store and serve customer accounts and transactions. In one embodiment, data store 230 includes one or more RL agent training record databases configured to store and serve records of RL agent actions. In one embodiment, these databases are MySQL databases or other relational databases configured to store and serve records of RL agent actions, or NOSQL databases or other graph databases configured to store and serve graph data records of RL agent actions. In one embodiment, these databases are Oracle® databases or Oracle Autonomous Databases. In some example configurations, data store(s) 230 may be implemented using one or more computing devices such as Oracle® Exadata compute shapes, network-attached storage (NAS) devices and/or other dedicated server device.

In one embodiment, reinforcement learning system components 220 include one or more components configured for implementing methods, functions, and features described herein associated with a reinforcement learning agent for evaluation of transaction monitoring systems. In one embodiment, reinforcement learning system components 220 include an adversarial RL agent 265. RL agent 265 is controlled (at least in part) by and updates a learned policy 267 over a course of training. During training, reinforcement learning system components 220 generate and store training records (or simulated episodes generated using a learned policy, as described above) 269 describing the performance of RL agent 265. In one embodiment, training records 269 may be one or more databases stored in data store 230. In one embodiment, reinforcement learning system components 220 include a training environment 270 which includes scenarios 272, an action space 273, and a state space 274. Training environment 270 is configured to simulate monitored data system 225. In one embodiment, a user may access a GUI 276 configured to accept inputs from and present outputs to users of reinforcement learning system components 220.

In one embodiment, monitored system components 225 may include data collection components for gathering, accepting, or otherwise detecting actions (such as transactions between accounts) in live data for monitoring by system 205. In one embodiment, monitored system 225 is a live data transaction system that is monitored by deployed scenarios 282. In one embodiment, monitored system 225 may include live, existing, or currently deployed scenarios 282, live accounts 284, and live transactions 286 occurring into, out of, or between live accounts 284. Deployed scenarios 282 include monitoring models or scenarios for evaluation of actions to detect known forms of forbidden or suspicious activity. (Monitoring models or scenarios may also be referred to herein as "alerting rules"). In one embodiment, monitored system components 225 may include suspicious activity reporting components for generation and transmission of SARs in response to detection of suspicious activity in a transaction or other action.

In one embodiment, other system components 227 may further include user administration modules for governing the access of users to monitoring system 205.

—Example Architecture—User Interface—

Figure 3:
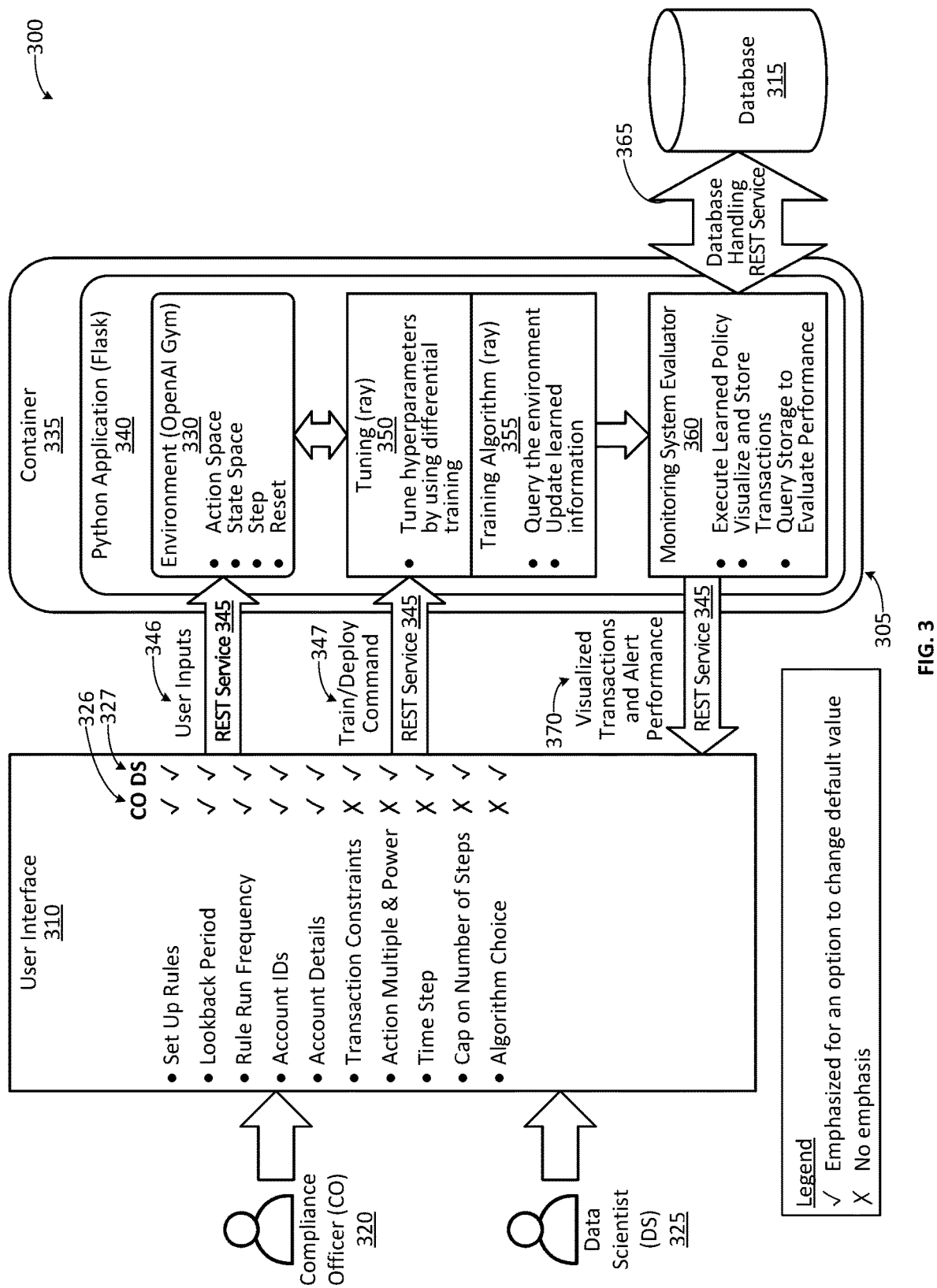
FIG. 3 illustrates an example program architecture associated with a reinforcement learning agent for evaluation of monitoring systems.

FIG. 3 illustrates an example program architecture 300 associated with a reinforcement learning agent for evaluation of monitoring systems. In one embodiment, the program architecture includes an RL application stack 305, a user interface 310, and a database 315.

In one embodiment, user interface (UI) 310 is a graphical user interface to reinforcement learning system components 220 of monitoring system 205, such as GUI 276. User interface 310 enables a user of monitoring system 305 to provide inputs to adjust settings of the reinforcement learning system components 220 used to test or evaluate a monitoring system. In one embodiment, UI 310 generates and presents visualizations and dashboards that display metrics describing the results of testing or evaluating a monitoring system with an RL agent.

Expected users of the system fall generally into two types: (1) compliance officers 320 (or other business analysts)—users tasked with reviewing information produced by evaluating the monitored system with a RL agent (as shown and described herein) for making decisions regarding rule modification, addition, and removal in the monitored system; and (2) data scientists—users tasked with testing, tuning, and deploying RL algorithms, and customizing an environment (for example, environment 330 or training environment 270) to simulate the monitored system (including specifying granularity of transaction amounts, length of time steps, or modifying the environment to add new account or transaction types).

There is a subset of user inputs available in user interface 310 that a compliance officer user 320 is unlikely to modify because a compliance officer user lacks technical knowledge, while a data scientist user 325 has the technical knowledge to competently use these inputs and may therefore access them. Accordingly, user interface 310 may have two types of views for interaction with the reinforcement learning system components: a simplified view associated with use by compliance officer users 320, and a full-featured view associated with data scientist users 325. The determination to present the simplified or full-featured view to a user is based on whether a stored account profile of the user indicates that the user is a compliance officer or a data scientist. In one embodiment, the selected view may be changed by the user, for example by modifying account settings. In one embodiment, the full-featured view may be inaccessible to compliance officer users 320, and only accessible to data scientist users 325.

In the simplified view, the data-scientist-only features are de-emphasized (that is, not readily accessible, for example by removing or hiding the menus for these inputs) and may be disabled so that modification of the data-scientist-only inputs is not possible from the simplified view. In the full-featured view, all features and inputs are accessible. In one embodiment, the simplified view includes and emphasizes for an option to change default values inputs that can be used to set up scenarios (alerting rules), adjust a lookback period, adjust a rule run frequency, edit account IDs, and edit account details, add new products, controls for these products, add a new customer segment or instantiate a new agent belonging to this segment as shown at reference 326 and discussed further herein.

The functions available in the simplified view allows the RL agent for evaluation of monitoring systems to be operated as a validation tool for observing and recording the performance of an existing monitoring system, for example to observe the performance of existing monitoring, or observe the performance of monitoring using modified thresholds in scenarios. In one embodiment, the full featured view includes and emphasizes the inputs included in the simplified view as well as including and emphasizing inputs that can be used to modify transaction constraints, adjust action multiple and power, adjust time step, edit a cap on the number of steps, and edit learning algorithm choice, as shown at reference 327 and discussed further herein. The additional functions available in the full-featured view allows the RL agent for evaluation of monitoring systems to be operated as an experimentation tool for revising the monitoring system, for example to generate recommended thresholds for scenarios of the monitoring systems.

In one embodiment, UI 310 enables data scientist users 325 to add new rules to the environment in a straightforward and simple manner so that the environment 170, 330 may be made as realistic for the RL agent as possible. In one embodiment, the UI allows rules to be input, for example as editable formulae or as logical predicates, variables, and quantifiers selectable from dropdown menus. In one embodiment, a data scientist user 325 is able to enter an input that specifies a lookback period for a rule. In one embodiment, a data scientist user 325 is able to enter an input that specifies a frequency for applying a rule.

In one embodiment, data scientist users 325 may use UI 310 to use and evaluate various reward mechanisms in the environment in order to identify a reward mechanism that works well for a chosen RL learning algorithm for the RL agent. In one embodiment, the reward mechanism supports an action or step penalty that reduces total reward in response to actions taken. In one embodiment, the reward mechanism supports a goal reward for reaching a specified goal state. In one embodiment, the reward mechanism supports a configurable discount factor (a discount parameter is a user-adjustable hyperparameter representing the amount future events lose value or are discounted for an RL agent as a function of time).

In one embodiment, data scientist users may use UI 310 to specify or edit various actions available in the environment and add new actions to the environment in order to scale the environment up or down. In one embodiment, the data scientist user may use the UI 310 to specify a granularity at which amounts of money are to be discretized. For example, the data scientist user may specify that the RL agent may move money in $1000 increments. Other larger or smaller increments may also be selected, depending on how finely the user wants the RL agent to evaluate transfer thresholds.

In one embodiment, data scientist users may use UI 310 to specify a unit of time that each time step in the environment corresponds to. For example, a time step may be indicated to correspond to a day, a half-day, an hour, or other unit of time. This enables adjustment to policies of the RL agent and experimentation with scenarios of various lookbacks. In one embodiment, the data scientist user may specify the number of time steps per day. For example, if the number of time steps is set to 1, at most one transaction per account may be made in a day by the RL agent. Or, for example, where the number of time steps is set to 24, the RL agent may make at most one transaction per account in each hour of the day.

Based on the configurability of the environment, the RL agent performs in realistic settings such that the evaluation results generated by the RL agent are informative. The environment is therefore configured to include support for multiple scenarios, including support both for rules with focus on accounts and rules with focus on customers, and including support for rules with varying lookbacks and frequencies. In one embodiment, users (both compliance officer and data scientist users) may use UI 310 to add scenarios to and remove scenarios from the environment in order to either replicate a transaction monitoring system already in place, or perform what-if analyses for proposed changes to the transaction monitoring system. Accordingly, in one embodiment scenarios (such as Mantas rules) are available from a library of scenarios. Users may use UI 310 to access the library to select rules from the library, and use UI 310 to adjust or specify thresholds of the selected rules. In one embodiment, UI 310 includes a rule creation module. The rule creation module enables users to compose their own custom scenarios. Users may then deploy configured scenarios from the library or custom scenarios to the environment using UI 310.

The environment is further configured to support multiple account types, products, and transaction channels. In one embodiment, users (both compliance officer and data scientist users) may use UI 310 to expand the environment to include account type, product, and transaction channel offerings by the institution so that the environment closely mirrors the monitoring requirements of the institution. Therefore, in one embodiment, the UI 310 is configured to allow the user to add new account types, and specify constraints associated with the new account types. In one embodiment, the UI 310 is configured to allow the user to add new products and transaction types or channels that may need additional or separate monitoring.

UI 310 is also configured to present reports, metrics, and visualizations that show strengths and weaknesses of the monitoring system. In one embodiment, UI 310 is configured to present metrics that quantify overall strength of the system. In one embodiment, UI 310 is configured to present metrics that quantify the contributions of individual scenarios to the overall strength of the system. In one embodiment, UI 310 is configured to show visual explanations of the paths used by the RL agent to move money to the destination. UI 310 may also be configured to present metrics that describe the vulnerability of products and channels to the RL agent.

—Example Architecture—RL Application Stack—

In one embodiment, inputs through UI 310 configure various components of RL application stack 305. In one embodiment, RL application stack includes a container 335, such as a Docker container or CoreOS rkt container, deployed in a cloud computing environment configured with a compatible container engine to execute the containers. Container 335 packages application code for implementing the RL agent and its environment with dependency libraries and binaries relied on by the application code. Alternatively, the application code for implementing the RL agent and its environment may be deployed to a virtual machine that provides the libraries and binaries depended on by the application code.

In one embodiment, container 335 includes an application 340. In one embodiment, application 340 is a web application hosted in a cloud environment. In one embodiment, application 340 may be constructed with Python using the Flask web framework. Alternatively, application 340 may constructed using a low-code development web framework such as Oracle Application Express (APEX). Implementation of the RL agent and its environment as an application 340 in in a web framework enables the whole RL agent and environment to be configured as a web application that can be readily hosted on the Internet, or in the cloud, and be accessible through REST requests. Application 340 unites the functions of the environment for the RL agent, the tuning, training, and execution of the RL agent with functions that use the RL agent execution to analyze or evaluate the performance of a transaction monitoring system.

In one embodiment, each of the data discussed above as editable using the UI 310 may be entered as user inputs in editable fields of a form, such as a web form. In one embodiment, user inputs accepted by UI 310 are parsed by UI 310 and automatically converted to electronic messages such as REST requests. The electronic messages carrying the user inputs are transmitted using REST service 345 to the application 340 in order to put into effect the modifications indicated by the user inputs. A first set of user inputs 346 are provided to environment 330 and are used to configure or set up environment 330, action space, or state space. For example, the simulated accounts of environment 330 may be configured by specifying account jurisdiction, indicating whether the account is in a high-risk geography or a low risk geography, and other account features. This first set of user inputs may include the problem or task to be attempted by the RL agent, such as transferring a particular quantity of money from a source account to a destination account. A second set of user inputs 347 are provided to tuning component 350 and training algorithm 355 of the RL agent, and are used to initiate the training exploration by the RL agent.

The training exploration (or simulated episodes generated using the learned policy) by the RL agent provides data for the analysis of the monitoring system. In one embodiment, monitoring system evaluator 360 executes a learned policy of the RL agent through one or more training iterations, visualizes and stores the transactions (that is, the actions performed by the RL agent), and queries storage through database handling rest service 365 to evaluate the performance of the scenarios. The visualized transactions and alert performance 370 are returned for display in UI 310 though rest service 345.

—Example Architecture—Environment—

Environment 330 provides a model or simulation of external surroundings and conditions with which an RL agent may interact or operate, and which may simulate or otherwise represent some other system. In one embodiment, environment is an OpenAI Gym environment. In one embodiment, environment 330 is a simulation of a monitored system, including accounts, transaction channels, and scenarios consistent with those applicable to the monitored system. Thus, the environment 330 may simulate a monitored system as currently configured and deployed, or simulate a proposed, but not yet deployed monitored system (for example, a monitored system in which account types or transaction channels beyond those already in place have been added, or a monitored system in which scenarios have been added, removed, or modified).

In one embodiment, the environment 330 is used to replicate a monitored transaction system (such as monitored system 225) that an entity (such as a financial institution or bank) has in place. Environment 330 may therefore be configured to include one or more accounts that can engage in transactions. Accounts in environment 330 can be one of multiple account types, such as savings, checking, trust, brokerage, or other types of accounts that are available in the transaction system being simulated. Each of these types of accounts may have different restrictions, such as withdrawal limits, deposit limits, and access permissions to transaction channels.

To further replicate or simulate the monitored transaction system, environment 330 may also be configured to include the scenarios that are deployed by the entity to monitor transactions between the accounts, as well as monitor transactions exiting or exiting the transaction system to external transaction systems maintained by other entities. The entity implements or deploys scenarios (such as deployed scenarios 282) in the monitored transaction system. The entity may tune one or more thresholds of the rules to adjust the conditions under which alerts are triggered. The deployed and tuned scenarios may be copied from the transaction system into environment 330 to provide a scenario configuration consistent with or the same as that deployed in the monitored transaction system. Scenarios may also be retrieved from a library of scenarios and placed into environment 330 to allow experimentation with rules not currently used in the live transaction system, or to introduce the rules with default threshold settings.

In one embodiment, environment 330 is configured to accept an operation or action by the RL agent, such as a transaction. For example, environment 330 is configured so as to enable the RL agent to specify source account, target or destination account, transaction amount, and channel for a transaction as an action in the environment. In one embodiment, environment 330 is also configured so as to enable the RL agent to open an account of a selected type.

In response to an action taken by the RL agent, environment 330 is configured to update the state of the environment and apply the scenarios to the resulting state. In response to an operation performed by the RL agent, the environment is configured to return an observation that describes the current state of environment 330. In one embodiment, the RL agent may perform one operation or action per time step, and return one observation of the state of the environment at the completion of the step. In one embodiment, an observation may include an amount of money in each account and the aggregated information (like total credit amount, total debit amount, and other information for each account) at each step, and an alert status (alert triggered or not triggered) for each scenario.

—Example Architecture—Environment—Action Space—

In one embodiment, environment 330 includes an action space module. The action space is configured to define possible actions which may be taken by the agent. In one embodiment, the action space is a discrete action space containing a finite set of values with nothing between them (rather than a continuous action space containing all values over a specified interval) in dimensions of the space. The action space includes a dimension for each aspect of a transaction, including, for example a four-dimensional action space including a dimension for source account, a dimension for destination account, a dimension for transaction amount, and a dimension for transaction channel.

The dimension of source accounts includes a listing of all accounts in the environment. Similarly, the dimension of destination accounts includes a listing of all accounts in the environment. The number of accounts may be entered by a user (such as compliance officer user 320 or data scientist user 325) through user interface 310, for example when configuring account IDs. So, for example, where there are five accounts in the environment, the destination account and source account dimensions will each have five entries corresponding to the five accounts in the environment.

The dimension of transaction amount includes an entry for every amount between zero and user-specified amount (the total amount to be moved by the RL agent) at a user-selected increment. In one embodiment, the user specified amount and user selected increment may be entered by the user (such as a data scientist user 325) as transaction constraints through user interface 310. In one embodiment, the increment of the transaction amount is $1000, and so in this case RL agent actions will transfer amounts that are multiples of $1000. Larger or smaller increments may be chosen by the user, or specified by default, for example, steps of $500, $2500, or $5000. The user-specified amount may be, for example, $50,000, $75,000, or $100,000.

The dimension of transaction channel may include cash, wire, monetary instrument ("MI" such as a check), and back office (such as transfers between general ledger accounts that are in the financial institution) transaction channels. The dimension of transaction channel may also include other transaction channels such as peer-to-peer channels like Zelle, Paypal, and Venmo. The number and types of channels available in the environment may be specified by the user (such as compliance officer user 320 or data scientist user 325) through user interface 310.

Thus, the action space encompasses all possible combinations of source, destination, transferred amount, and transaction channel available to the RL agent. Each action by an RL agent may be expressed as a tuple with a value selected from each dimension, for example where the action space has the four dimensions above, an action may be expressed as [Source_Account, Destination_Account, Amount, Channel].

In this way, a processor executing a method associated with RL-agent-based evaluation of transaction monitoring systems may configure an environment to simulate a monitored system for the RL agent, and in particular, configure the environment to define the action space for the environment.

—Example Architecture—Environment—State Space—

In one embodiment, environment 330 includes a state space module. The state space is configured to describe, for the environment, all possible configurations of the monitored system for the variables that are relevant to triggering a scenario. Thus, the state space that is used may change based on the scenarios deployed in the environment. If a user adds a new rule that evaluates a variable not captured by the other rules, the state space should be expanded accordingly. In the context of transaction monitoring, the state space is finite or discrete due to the states being given for a quantity of individual accounts.

In one embodiment, the system parses all scenarios that are deployed to environment 330 to identify the set of variables that are evaluated by the rules when determining whether or not an alert is triggered. The system then automatically configures the state space to include those variables. For example, the system adds or enables a data structure in the state space that accommodates each variable. Similarly, should a new rule that uses an additional variable be added to environment 330, the system will parse the rule to identify the additional variable, and automatically configure the state space to include the additional variable. Or, should a rule be removed from environment 330 that eliminates the use of a variable, the system may automatically reduce the state space to remove the unused variable. In this way, the state space automatically is automatically configured to test any rules that are deployed into environment 330, expanding or contracting to include those variables used to determine whether a scenario is triggered.

One example state space includes current balance for each account, aggregate debit for each account, and aggregate credit amount for each account. If a rule is added to the environment that evaluates a ratio of credit to debit, the system parses the new rule, identifies that the credit to debit ratio is used by the rule, and automatically configures the state space to include the credit to debit ratio.

In this way, a processor executing a method associated with RL-agent-based evaluation of transaction monitoring systems may configure an environment to simulate a monitored system for the RL agent, and in particular, configure the environment to define the state space for the environment.

—Example Architecture—Environment—Step Function—

In one embodiment, environment 330 includes a step function or module. The step function accepts as input an action from the RL agent. In one embodiment, the step function returns three items: an observation of a next state of environment 330 resulting from the action, a reward earned by the action, and an indication of whether the next state is a terminal (or end or done) state or not. The step function may also return diagnostic information that may be helpful in debugging.

In one embodiment, the observation is returned as a data structure such as an object containing values for all variables of the state space. For example, the observation object may include current balances for each account.

In one embodiment, the step function is configured to determine (i) the next state based on the input action; (ii) whether any scenarios deployed in the environment 330 are triggered by the next state; and (iii) whether a goal state is achieved. As used herein, the RL agent's behavior is not probabilistic—the RL agent is not permitted to act unpredictably—and so the transition probability (for successful transition to the determined next state) for each step is 100%.

During execution of the step function, a reward for the action taken is applied. For example, an interpreter may query the environment to retrieve the state and determine what reward should be applied to the total reward for the individual step. In one embodiment, the reward earned by taking the action is returned as a floating point data value such as a float or double data type. In one embodiment, the value is calculated by a reward module, and includes applying a small penalty (or negative reward) for taking the step, a large penalty where an scenario is triggered, and a reward (that is, a positive reward) where a goal state is accomplished. The RL agent is configured to track the cumulative reward for each step over the course of a training iteration. For example, the sum of the rewards for each step of a training iteration is the cumulative reward for that training iteration.

In one embodiment, a training episode or iteration refers to an exploration of an environment by the RL agent from an initial state (following a setup/reset) to a terminal (or end or done) state indicating that the RL agent should reset the environment. Accordingly, the terminal state status is returned as a Boolean value or flag. This terminal state status indicates whether or not the state is a terminal state of the environment. Where the terminal state status is True, it indicates that the training episode is completed, and that the environment should be reset to the initial state if further training is to occur. Where the terminal state status is False, training may continue without resetting the environment to the initial state. Terminal states include accomplishing the goal. (i.e. when the entire amount is transferred to the target account or length of episode has reached the prescribed limit). Reaching a terminal state indicates an end of one training iteration. In response to receiving an indication of a terminal state, the RL agent is configured to adjust its policy to integrate information learned in the training iteration into its policy, and to reset the environment.

In this way, a processor executing a method associated with RL-agent-based evaluation of transaction monitoring systems may configure an environment to simulate a monitored system for the RL agent, and in particular, configure the environment to define the step function for the environment.

—Example Architecture—Environment—Reset Function—

In one embodiment, environment 330 includes a reset function or module. In one embodiment, the reset function accepts an initial state as an input, and places environment 330 into the input initial state. In one embodiment, the reset function does not accept an input, and instead retrieves the configuration of the initial state from a location in memory or storage. In one embodiment, the reset function returns an initial observation of a first or initial state of environment 330. The reset function thus serves as both an environment setup function for an initial training episode, as well as a reset function to return the environment to its initial state for additional training episodes. In one embodiment, the reset function is called at the beginning of a first training episode, and then called in response to the terminal status state being true while convergence criteria (as discussed herein) remain unsatisfied.

—Example Architecture—Hyperparameter Tuning—

In one embodiment, the RL agent is constructed using components from a reinforcement learning library, such as the open-source Ray distributed execution framework for reinforcement learning applications. In one embodiment, the RL agent includes a tuning module 350. In one embodiment, tuning module 350 is implemented using Ray. The RL agent has one or more hyperparameters—parameters that are set independently of the RL agent's learning process and used to configure the RL agent's training activity—such as learning rate or method of learning. Tuning module 350 operates to tune hyperparameters of the RL agent by using differential training. Hyperparameters that affect the performance of learning for the RL agent are identified. Then, those parameters that have been identified as affecting performance of the RL agent are tuned to identify hyperparameter values that optimize performance of the RL agent. The identified best hyperparameters are selected to configure the RL agent for training. The tuned values for the hyperparameters are input to and received by the system, and stored as configuration information for the RL agent. In one embodiment, selected hyperparameters include those that control an amount by which a transition value (an indication of expected cumulative benefit of taking a particular action from a state at a particular time step, as discussed below) is changed. The hyperparameters may thus adjust both the rapidity with which a policy can be made to converge and the accuracy of performance of trained RL model.

In this way, the processor is configured to initiate training of the RL agent to learn a policy that evades scenarios of the simulated monitored system while completing a task, and in particular, to receive and store one or more hyperparameter values that control an amount or increment by which a transition value is changed.

—Example Architecture—Training Algorithm—

In one embodiment, the RL agent includes a training module 355. After the learning hyperparameters are chosen, the RL agent can begin training. Training module 355 includes a training algorithm configured to cause the RL agent to learn a policy for evading scenarios operating within the environment 330.

In one embodiment, the sequence of actions taken by the RL agent is a Markov decision process. A Markov decision process includes a loop in which an agent performs an action on an environment in a current state, and in response receives a new state of the environment (that is, an updated state or subsequent state of the environment resulting from the action on the environment in the current state) and a reward for the action. In one embodiment, the states of the Markov decision process used for training are the states of the state space discussed above. In one embodiment, the actions performable by the RL agent in the Markov decision process used for training are the actions belonging to the action space discussed above. Each action (belonging to the action space) performed by the RL agent in the environment (in any state belonging to the state space) will result in a state belonging to the state space.

In response to the action taken by the RL agent, the environment will be placed into a new state. Note that transition probability—that is, a probability that a transition to a subsequent state occurs in response to an action—is 100% in the Markov decision process used for training the RL agent. Actions taken by the RL agent are always put into effect in the environment. Transition probability in the training process is therefore not discussed. Note also that the action space may include "wait" actions or steps that result in maintaining a state, delaying any substantive action. Wait actions may be performed either expressly as an action of doing nothing, or for example by making a transfer of $0 to an account, or making a transfer of an amount from an account back into the account (such that the transfer is made out of and into one account without passing through another account).

In response to the environment entering the new state, a reward value for the new state is calculated. The reward value for entering the new state expresses a value (from the RL agent's perspective) of how beneficial, useful, or "good" it is to be in the new state in view of a goal of the RL agent. Accordingly, in one embodiment, states in which a goal (such as moving a specified amount of money into a specific account) is accomplished result in a positive reward; states that do not accomplish the goal, and do not prevent accomplishment of the goal receive a small negative reward or penalty, indicating a loss in value of the goal over time (accomplishing the goal more quickly is "better" than accomplishing it more slowly); and states which trigger an alert and therefore defeat accomplishment of the goal receive a large negative reward or penalty, indicating the very low value to the RL agent of failing to accomplish the goal. Additionally, a further, moderate penalty, may be applied to transferring amounts out of the destination account because such transfers work against achieving the goal.

The RL agent includes a policy—a mapping from states to actions—that indicates a transition value for the actions in the action space at a given time step. The mapped actions for a state may be restricted to those that are valid in a particular state. Validity may be based on what it is appropriate to accomplish within the system simulated by the environment. For example, in an environment simulating a transaction system, in a state in which account A has a balance of $1,000, transferring $10,000 from account A to another account may not be valid. In one embodiment, a default, untrained, or naïve policy is initially provided for adjustment by the RL agent.

The mapping may include a transition value that indicates an expected future benefit of taking an action from a state at a particular time step. This transition value is distinct from the immediate reward for taking an action. The transition value for a particular action may be derived from or based on cumulative rewards for sequences of subsequent states and actions that are possible in the environment following the particular action, referred to herein as "downstream transitions". The mapping may be stored as a data structure that include data values for transition values for each state and valid action pairing at each time step or may be represented as the weights of a neural network that are continually updated during training.

In one embodiment, monitoring system evaluator 360 is configured to cause the RL agent to execute its current learned policy in one or more training episodes in order to train the RL agent. At the beginning of RL agent training, the policy includes default values for the transition values. RL agent adjusts the policy by replacing the transition values for an action from a state at a point in time with transition values adjusted based on observed cumulative rewards from downstream transitions. The transition values are adjusted based on application of one or more hyperparameters, for example, a hyperparameter may scale a raw transition value derived from downstream transitions. The adjusted transition values for the policy are revised or updated over multiple episodes of training in order to arrive at a policy that causes the behavior of the RL agent to converge on a maximum cumulative reward per episode.

The immediate reward and policy (the set of transition values) are learned information that the RL agent learns in response to exploring—taking actions in accordance with its policy—within the environment. To train the RL agent, the training algorithm can query the environment to retrieve current state, time step, and available actions, and can update the learned information (including the policy) after taking an action. In one embodiment, the RL agent performs actions in the environment in accordance with its policy for one training episode, records the rewards for those actions, and adjusts (or updates or replaces) transition values in the policy based on those recorded awards, and then repeats the process with the adjusted policy until RL agent performance converges on a maximum.

In this way, the reinforcement learning agent is trained over one or more training episodes to learn a policy that evades scenarios of the simulated monitored system while completing a task such as moving an amount from a source account to a destination account in the fastest possible time frame and without triggering any alerts.

In one embodiment, monitoring system evaluator 360 is configured to store the steps taken by the RL agent over the course of training as a record of steps. During the training, action, result state, alert status for one or more scenarios operating in the environment, and goal achieved status are recorded for each time step of each training episode by monitoring system evaluator 360. Training is timed from initiation of the training process until convergence, and the training time is recorded. The recorded items are stored for example in database 315 using REST requests through database handling REST service 365. In one embodiment, database 315 is a MySQL database or other relational database, a NOSQL graph database or other database configured to store and serve graph data, or other database. In one embodiment, database 315 is included in training records 269. The recorded items form a basis for evaluating the performance of the individual scenarios and combined strength of the alerting system for the monitored system. For example, counts of triggered alerts over a training run or count of alerts triggered when episodes are sampled from the agent's learned policy are a proxy for strength of the rule in thwarting prohibited activity, while overall time to train the RL agent, and number of steps in an optimal training episode serve as proxies for the overall strength of the alerting system.

These actions, states, alert statuses, goal achieved statuses, and proxy metrics for rule and overall monitoring performance may be retrieved from database 315 by REST service 365 by monitoring system evaluator 360. Monitoring system evaluator 360 is configured to store transactions (in one embodiment, action and resulting state as well as alert status(es) and goal achieved status) performed. Accordingly, the transactions (and metrics derived from them) may be stored in database 315 so that they can be queried and used in subsequent processes.

In this way, the steps taken by the reinforcement learning agent, the result states, and the triggered alerts for the training episodes are recorded by the processor.

—Example Training Run—

One example training run of an RL agent for evaluation of monitoring systems. The RL agent is trained to identify a policy that evades scenarios of a monitoring system. The environment for the RL agent is small, having five accounts, three scenarios (RMF, HRG, and Sig_Cash), and three transaction channels. In one embodiment, the RL agent is a proximal policy optimization (PPO) agent. An example optimal training episode satisfying the convergence criteria is performed, causing the training iterations to cease. In one embodiment, the convergence criteria include satisfying one or more of the following criteria: (i) standard deviation of Episode Reward mean is less than a first pre-defined value for a minimum standard deviation of mean reward per episode set by a user; (ii) number of training iterations are less than a second pre-defined value for the setting set by the user for a minimum number of training iterations (to guard against chance success by the agent and to ensure sufficient data points to act as a metric of system strength); or (iii) training time—time taken for training the RL agent—is less than a third pre-defined value for a minimum amount of training time. These pre-defined values may be provided by the user through UI 310. Over the course of the training run (from initiation through training episodes until convergence):

The total count of RMF alerts is 9873;
The average RMF alerts per training episode is 0.030804031075473463;
The total count of HRG alerts is 5453;
The average HRG alerts per training episode is 0.017013509718885527;
The total count of Sig_Cash alerts is 3512;
The average Sig_Cash alerts per training episode is 0.010957536426320552;
The RL agent was successfully trained;
The time taken to complete the training of the RL agent was 4.8266 minutes;
The maximum reward during training was −0.81;
The length of the optimal episode (shown below in Table 1) was 16 steps; and
The cumulative reward for the optimal episode was −0.91.

Each of these items may be automatically determined from stored records of a training run.

In one embodiment, the steps of a training episode are recorded in a format that describes the action taken by the RL agent and the result state following that action, for example in the following format: ['sourceAccount', 'destinationAccount', transferAmount, 'transaction Channel'] [account_1_balance. account_2_balance . . . account_N_balance.] where there are N accounts in the environment. The action is described between the first set of brackets, and the resulting state of the environment following the action is described between the second set of brackets. For example, Table 1 below shows the optimal episode arrived at by the RL agent in the example training run:

TABLE 1

| Step | Action | Result State |
|------|--------|--------------|
| 01 | ['ACCT_1', 'ACCT_5', 10000, 'WIRE'] | [15000. 0. 0. 0.10000.] |
| 02 | ['ACCT_2', 'ACCT_2', 0, 'WIRE'] | [15000. 0. 0. 0. 10000.] |
| 03 | ['ACCT_2', 'ACCT_2', 0, 'WIRE'] | [15000. 0. 0. 0.10000.] |
| 04 | ['ACCT_2', 'ACCT_2', 0, 'WIRE'] | [15000. 0. 0. 0.10000.] |
| 05 | ['ACCT_2', 'ACCT_2', 0, 'WIRE'] | [15000. 0. 0. 0. 10000.] |
| 06 | ['ACCT_2', 'ACCT_2', 0, 'WIRE'] | [15000. 0. 0. 0. 10000.] |
| 07 | ['ACCT_2', 'ACCT_2', 0, 'WIRE'] | [15000. 0. 0. 0.10000.] |
| 08 | ['ACCT_2', 'ACCT_2', 0, 'WIRE'] | [15000. 0. 0. 0. 10000.] |
| 09 | ['ACCT_1', 'ACCT_5', 5000, 'WIRE'] | [10000. 0. 0. 0. 15000.] |
| 10 | ['ACCT_1', 'ACCT_5', 5000, 'CASH'] | [5000. 0. 0. 0. 20000.] |
| 11 | ['ACCT_4', 'ACCT_4', 0, 'WIRE'] | [5000. 0. 0. 0.20000.] |
| 12 | ['ACCT_4', 'ACCT_4', 0, 'WIRE'] | [5000. 0. 0. 0.20000.] |
| 13 | ['ACCT_4', 'ACCT_4', 0, 'WIRE'] | [5000. 0. 0. 0.20000.] |
| 14 | ['ACCT_4', 'ACCT_4', 0, 'WIRE'] | [5000. 0. 0. 0.20000.] |
| 15 | ['ACCT_4', 'ACCT_4', 0, 'WIRE'] | [5000. 0. 0. 0.20000.] |
| 16 | ['ACCT_1',' ACCT_5', 5000, 'MI'] | [ 0. 0. 0. 0.25000.] |

These steps of an episode may be stored for example in training records database 269 as rows in a table, or as a text file, or as one or more other data structures.

Figure 4A:
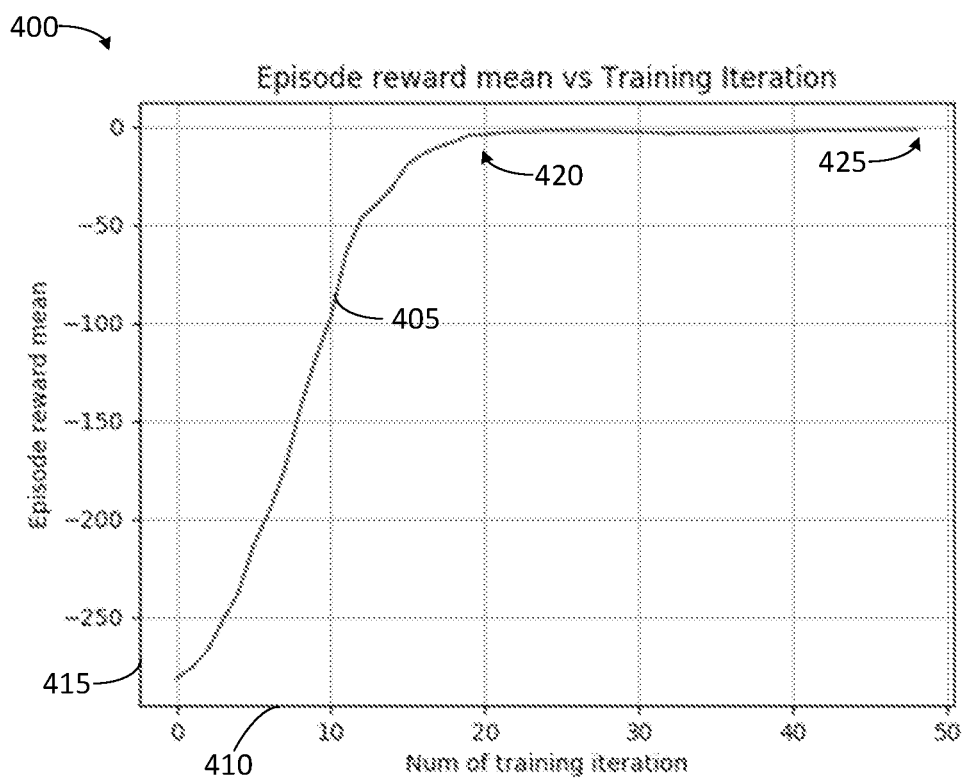
FIG. 4A illustrates a plot of episode reward mean against training iteration for an example training run associated with a reinforcement learning agent for evaluation of monitoring systems.
Figure 4B:
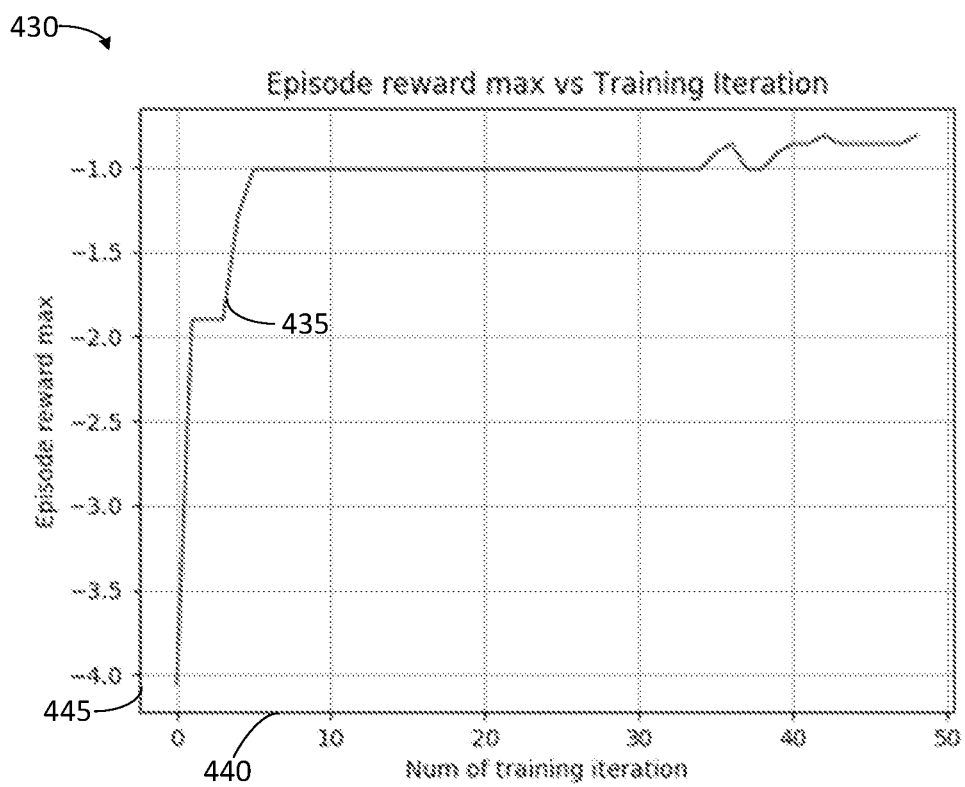
FIG. 4B illustrates a plot of episode reward maximum against training iteration for an example training run associated with a reinforcement learning agent for evaluation of monitoring systems.
Figure 4C:
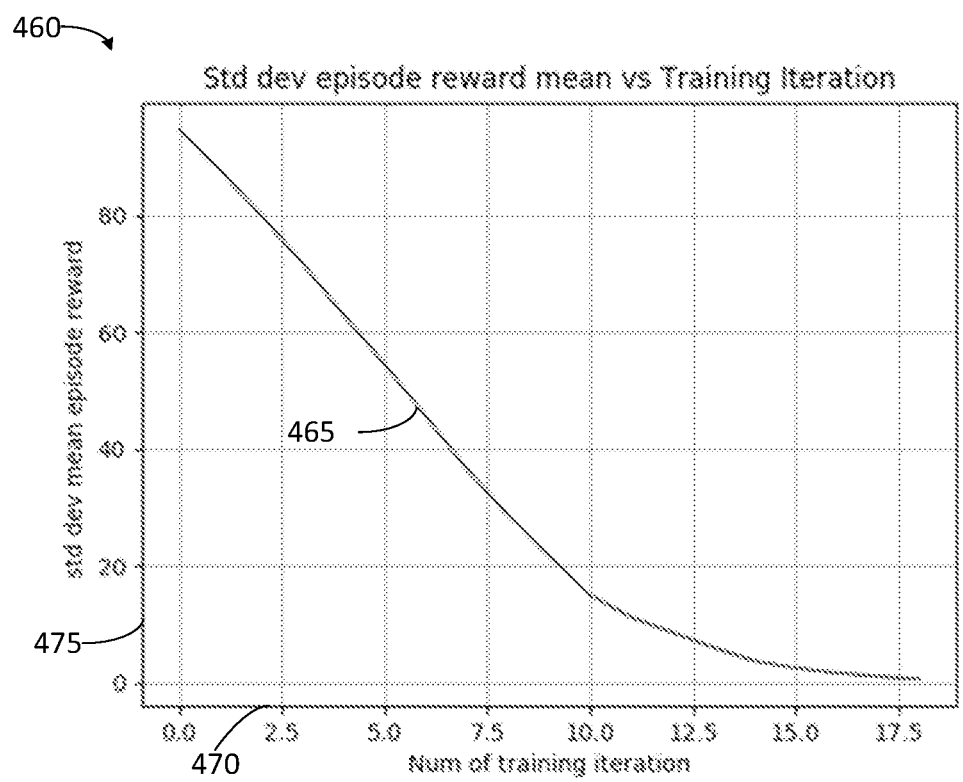
FIG. 4C illustrates a plot of standard deviation of episode reward mean against training iteration for an example training run associated with a reinforcement learning agent for evaluation of monitoring systems.

FIGS. 4A-4C illustrate the progress of training the RL agent for evaluation of monitoring systems to identify a policy that evades scenarios in the example training run above. FIG. 4A illustrates a plot 400 of episode reward mean against training iteration 405 for the example training run. Episode reward mean against training iteration 405 is shown plotted against a number of training iterations axis 410 and an episode reward mean 415. The plot of episode reward mean against training iteration 405 shows how well the RL agent has learned over successive iterations. The point at which the curve flattens out at some value that is close to one or zero, in this example training run at approximately 420, this indicates that the RL agent has been trained well and has learned to actually move the money without triggering any alerts. In this example, it took the RL agent approximately 20 training iterations until the RL agent was well trained, and then the training was refined and reinforced until a point near 50 training iterations 425 at which the curve of episode reward mean against training iteration is found to have converged on a maximum by satisfying the convergence criteria. Thus, generally speaking, the training iterations or episodes to the left of point 420 may be considered to be failures to evade the scenarios by the RL agent, in which the RL agent triggers one or more scenarios, while the episodes to the right of point 420 show an RL agent that has become successful at evading the scenarios.

FIG. 4B illustrates a plot 430 of episode reward maximum against training iteration 435 for the example training run. Episode reward maximum against training iteration 435 is shown plotted against a number of training iterations axis 440 and an episode reward mean 445.

FIG. 4C illustrates a plot 460 of standard deviation of episode reward mean against training iteration 465 for the example training run. Standard deviation of episode reward mean against training iteration 465 is shown plotted against a number of training iterations axis 470 and a standard deviation of episode mean reward 475.

—Example Architecture—Visualizations—

In one embodiment, monitoring system evaluator 360 is configured to query storage to evaluate performance of the scenarios and monitoring system, and to generate visualizations of the transactions and of the alert performance describing the performance of scenarios and monitoring system. These visualized transactions and alert performance 370 are transferred by rest service 345 to UI 310 for presentation to users. In one embodiment, monitoring system evaluator is configured to retrieve action, result state, alert status for rules operating in the environment, and goal achieved status from database 315, and present configure the information as needed to render graphs, charts, and other data presentation outputs useful in real-time, what-if analysis of monitoring system strength.

Figure 5:
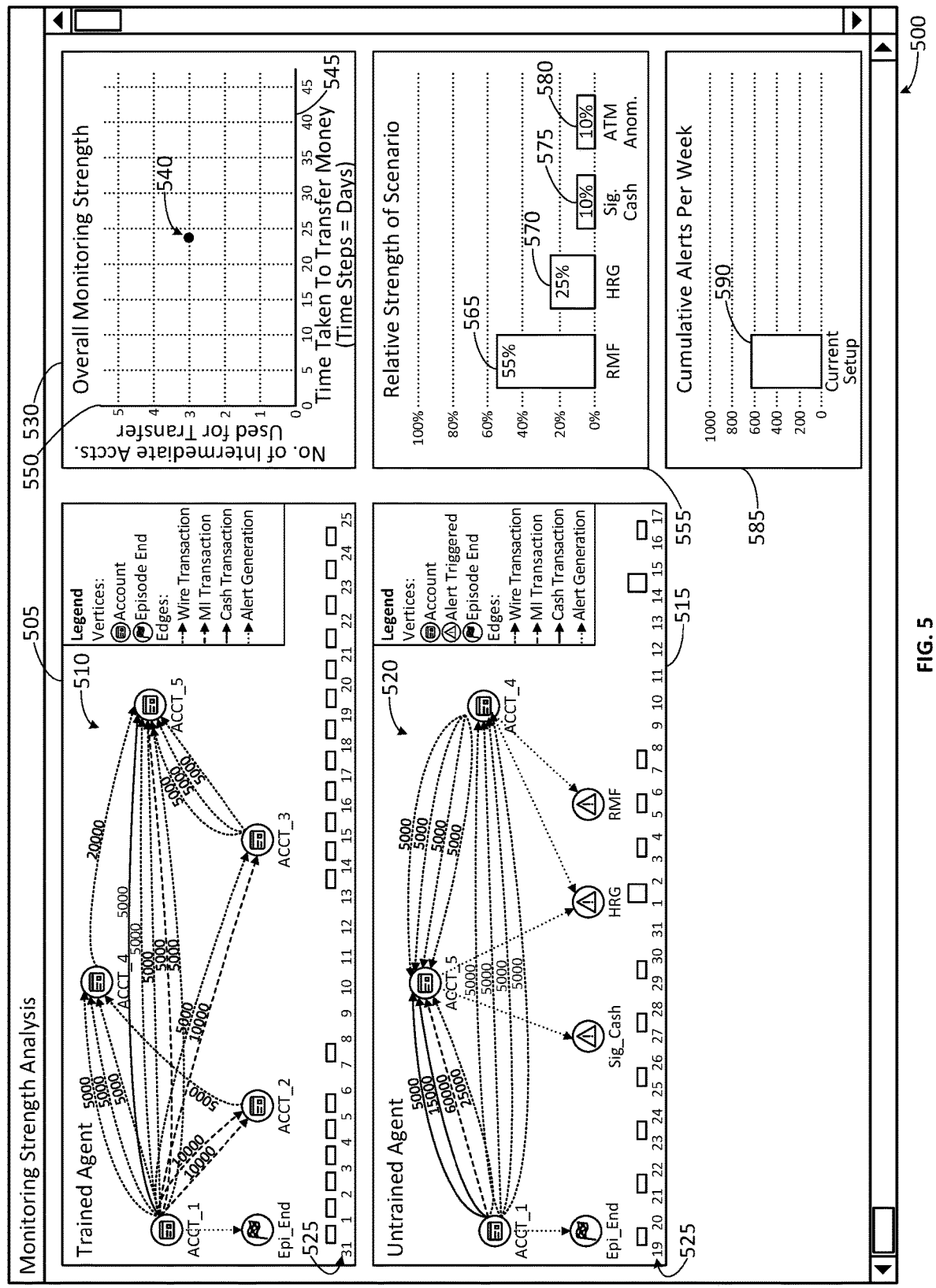
FIG. 5 illustrates one embodiment of a visual analysis GUI showing a visual analysis of monitoring strength for an example monitoring system associated with a reinforcement learning agent for evaluation of monitoring systems.

FIG. 5 illustrates one embodiment of a visual analysis GUI 500 showing a visual analysis of monitoring strength for an example monitoring system associated with a reinforcement learning agent for evaluation of monitoring systems. The GUI 500 is generated based on outputs from monitoring system evaluator 360, which evaluates data generated in the RL agent training process. In one embodiment, GUI 500 is a page of UI 310. GUI 500 presents an example situation in which there are two simulated money launderers (RL agents) trying to transfer 75000 from account 1 to account 5: the first agent is trained for the scenarios applicable in the environment, while the second agent is untrained. The first agent successfully transfers the amount to destination account without triggering alerts. The second agent triggers alerts. Because first agent has to solve a more complex problem, it takes a longer time and more intermediate account to transfer the money.

In one embodiment, outputs presented in GUI 500 include visualization(s) of an optimal transaction sequence 505 performed by a trained agent to achieve the goal of transferring an amount of money into a destination account. In one embodiment, monitoring system evaluator selects a transaction sequence from those stored in database 315 to be an optimal sequence based on a predetermined criteria. In one embodiment, where the criteria is maximized reward over a training episode, the optimal transaction sequence may be the transactions of a training episode in which an RL agent achieved a maximum reward among the training episodes of a training run. In another example, where the criteria is achieving convergence in a training episode, the optimal transaction sequence may be the transactions of a final episode of a training run in which the RL agent's performance converged on a maximum score.

In one embodiment, the steps of the selected optimum training episode are retrieved from database 315 by monitoring system evaluator 360, parsed to identify the accounts that are used in the episode, the transactions that occurred during the episode, and the alerts triggered during the episode (if any). Monitoring system evaluator 360 then generates a network or graph of the behavior by the trained agent, such as example trained agent graph 510. The graph may include vertices or nodes that indicate accounts, alerts triggered (if any), and the end of the episode. For example, graph 510 includes account vertexes ACCT_1, ACCT_2, ACCT_3, ACCT_4, and ACCT_5, and episode end vertex Epi End. The graph may include edges or links that indicate actions such as transactions or triggering of alerts. The graph may be configured to show edges representing different types of transaction channels using different line styles (such as dot/dash patterns) or colors. For example, graph 510 includes edges that represent wire transactions, monetary instrument (MI) transactions, and cash transactions, and edges that represent alert generation for an end of episode alert. The edges may be labeled with the transaction amount.

In one embodiment, outputs presented in GUI 500 include visualization(s) of a naive transaction sequence 515 performed by an untrained RL agent for contrast with, and to draw out insights by comparison to, the behavior of a trained RL agent. The naive transaction sequence may be the transactions of a first or initial training episode for the RL agent. As discussed above, monitoring system evaluator 360 retrieves the steps of the selected naive training episode are from database 315, parses the steps to identify the accounts that are used in the episode, the transactions that occurred during the episode, and the alerts triggered during the episode (if any), and generates a graph of the behavior of untrained agent, such as example untrained agent graph 520. The actions of the untrained agent result in multiple alert generations, including sig cash alerts, HRG alerts, and RMF alerts, as can be seen in graph 520.

In one embodiment, visualizations 505, 515 include a time progress bar 525 that includes time increments (such as dates) for the period during which the RL agent was active for the training episode shown. Time progress bar 525 may also include visual indicators such as bar graph bars above the dates that show dates on which the RL agent made transactions between accounts. In one embodiment, the height of the bar graph bar is a tally or total of transactions between accounts and triggered alerts for a single time increment (which, for example, may correspond to a single day).

In one embodiment, the outputs presented in GUI 500 include visualization(s) of overall monitoring strength 530 of the monitoring system expressed in terms of number of intermediate accounts required to achieve the goal and number of time steps taken to achieve the goal. In one embodiment, monitoring system evaluator 360 parses the steps of the optimal training episode retrieved from database 315 to identify accounts (other than the initial account and goal account) into which money is transferred and counts the number of those accounts to determine the number of intermediate accounts. In one embodiment, monitoring system evaluator 360 counts the steps of the optimal training episode retrieved from database 315 to determine the number of time steps taken to achieve the goal. The overall monitoring strength is plotted as a point (for example, point 540) with coordinates of the number of time steps and the number of intermediate accounts against a time taken to transfer money axis 545 and a number of intermediate accounts axis 550. Points closer to the origin (0,0) indicate weaker overall monitoring strength. Points farther from the origin indicate stronger overall monitoring strength. Example point 540 has coordinates of 24 days to move all the money and use of three intermediate accounts.

Use of data from RL agent training to generate the overall monitoring strength metric (number of intermediate accounts used and time taken to transfer) provides a consistent, objective metric describing overall strength of a monitoring system. Consistent, objective metrics for overall monitoring strength were not possible for computers before the systems, methods, and other embodiments described herein due at least to the size of the state and action spaces. Thus, in this way, for example, strength of monitoring of the simulated monitored system is determined based on the recorded training episodes.

In one embodiment, the outputs presented in GUI 500 include visualization(s) of the relative strength of scenario between the scenarios operating in the environment, such as example relative strength of scenario plot 555. In one embodiment, monitoring system evaluator 360 parses training episodes of a training run to identify the triggered alerts, by scenario. Monitoring system evaluator 360 tallies or counts the total number of alerts during the training run for each scenario, and the total number of alerts of all types. Monitoring system evaluator 360 then determines for each type of scenario, a ratio of alerts for the type of scenario to the overall count of alerts for all types of scenarios. Monitoring system evaluator 360 then generates a graph or chart, such as a bar graph or pie chart, showing the relative percentages of alerts for the various types of scenarios. As shown in example relative strength of scenario plot 555, 55% of alerts 565 over the course of a training run were from a rapid movement of funds (RMF) scenario, 25% of alerts 570 over the course of the training run were from a high-risk geography (HRG) scenario, 10% of the alerts 575 over the course of the training run were from a significant cash scenario, and 10% of the alerts 580 over the course of the training run were from an ATM anomaly scenario. Relative strength of a scenario may also be determined by looking at the difference in proportion of alerts generated by each scenario for a trained agent and an untrained agent. If the proportion of alerts triggered by a scenario for a trained agent is lower than that of an untrained agent, it means that the agent has learned to evade the scenario meaning that scenario has a lower relative strength.

Use of data from RL agent training to generate these relative strength of scenario metrics provides a consistent, objective metrics describing the individual contributions of scenarios in a monitoring system. This provides the user with the incremental value of each rule in the system, and reveals gaps in scenario coverage. Consistent, objective metrics for individual contributions of scenarios were not possible for computers before the systems, methods, and other embodiments described herein.

In one embodiment, the outputs presented in GUI 500 include visualization(s) of cumulative alerts per week, such as example cumulative alerts per week plot 585. In one embodiment, monitoring system evaluator 360 calculates an average number of alerts per training episode for each scenario type over the course of a training run, and stores it in database 315. Monitoring system evaluator 360 retrieves the average numbers of alerts for each scenario for the training run, and totals them to find an average number of alerts per training episode for the training run. Monitoring system evaluator 360 retrieves an average length of training episode over the training run and converts the retrieved episode length to weeks. Monitoring system evaluator 360 then divides the average number of alerts per training episode by the average number of weeks per training episode, yielding a number of alerts accumulated per week. Monitoring system evaluator 360 then generates a bar graph or bar chart showing this cumulative number of alerts per week, for example as shown in example cumulative alerts per week plot 585. The bar 590 presented in example cumulative alerts per week plot 585 is the cumulative alerts per week generated under a current configuration or setup of scenarios in the environment. In other GUIs, cumulative alerts per week for current and/or other configurations may be presented in the bar graph alongside each other for comparison.

Use of data from RL agent training to generate the cumulative alerts per week or the percentage increase in cumulative alerts per week provides a consistent, objective count of the alerting burden caused by any given configuration of scenarios in a monitoring system. This allows a user to assess the administrative impact that a particular scenario configuration or setup may have. Consistent, objective metrics for predicting the alerting burden of a particular scenario configuration were not possible for computers before the systems, methods, and other embodiments described herein.

Figure 6:
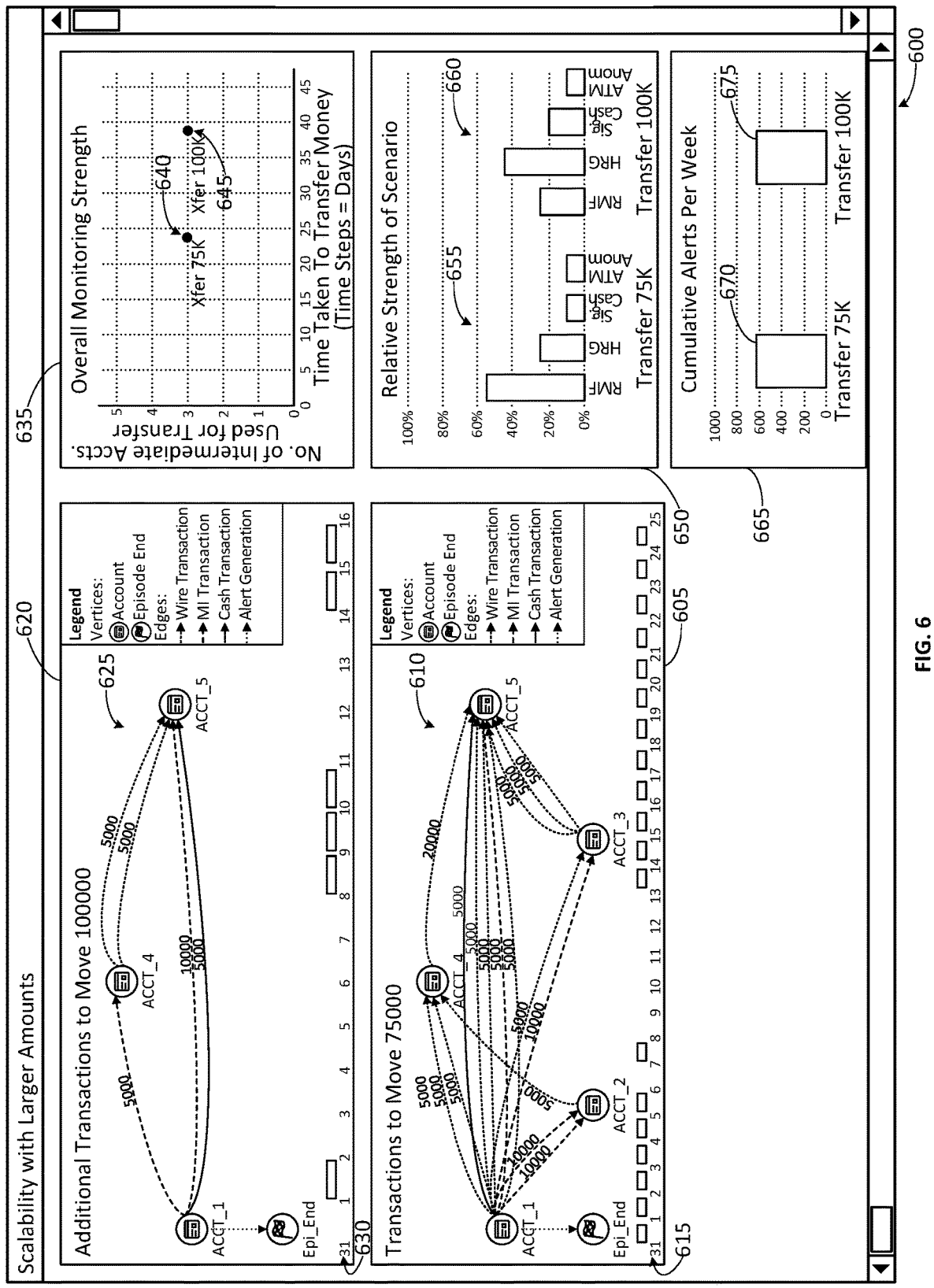
FIG. 6 illustrates one embodiment of a scalability analysis GUI showing a visual analysis of scalability of monitoring strength for transaction amount in an example monitoring system associated with a reinforcement learning agent for evaluation of monitoring systems.

FIG. 6 illustrates one embodiment of a scalability analysis GUI 600 showing a visual analysis of scalability of monitoring strength for transaction amount in an example monitoring system associated with a reinforcement learning agent for evaluation of monitoring systems. GUI 600 is generated based on outputs from monitoring system evaluator 360, which evaluates data generated in the RL agent training process. In one embodiment, GUI 600 is a page of UI 310. GUI 600 enables comparison of monitoring system performance from smaller to larger transfer amounts, and allows a user to view the effects that differing transfer amounts have on the monitoring system. GUI 600 presents an example situation in which a simulated money launderer (RL agent) is presented with two separate challenges: (i) transferring a first, relatively smaller amount—75000; and (ii) transferring a second, relatively larger amount—100000. Intuitively, where the target amount to transfer increases, it should take longer to transfer the amount without triggering alerts. As discussed below, this is borne out by objective analysis using the RL training data. The user can observe at a glance from GUI 600 that in this example, relative monitoring capacity for RMF decreased at the higher amount, but alerts per week were unaffected by the change in amount to transfer. The information generated and presented in GUI 600 is generated and presented in a manner substantially similar to that described for GUI 500 above.

In one embodiment, outputs presented in GUI 600 include visualizations of an optimal transaction sequence for transferring a relatively smaller amount (such as 75000) 605 identified in the course of an RL agent training run. Monitoring system 360 generates a graph, such as example graph 610, to display the actions for an optimal transaction sequence for moving the smaller amount. Visualization 605 includes a time progress bar 615 indicating when the transactions shown in graph 610 took place.

In one embodiment, outputs presented in GUI 600 include visualizations of a portion of an optimal transaction sequence for transferring a relatively larger amount (such as 100000) 620 identified in the course of an RL agent training run. Monitoring system 360 generates a graph, such as example graph 625, to display the actions for an optimal transaction sequence for moving the larger amount that are additional to (or different from) the optimal transaction sequence for moving the smaller amount. Visualization 620 also includes a time progress bar 630 indicating when the transactions shown in graph 610 took place. Thus, visualization 620 shows the further steps taken by the RL agent to move the larger amount beyond the steps taken to move the smaller amount.

Alternatively, visualization 620 may simply show an optimal transaction sequence for transferring the relatively larger amount, and the days on which the transaction steps were taken. This alternative visualization may be presented rather than showing differences between the transactions to move the smaller amount and the transactions to move the larger amount.

In one embodiment, the outputs presented in GUI 600 include visualization(s) of overall monitoring strength 635 of the monitoring system showing the overall monitoring strength for both the smaller and larger amounts. In this example, the overall monitoring strength against a goal of moving the smaller amount and against a goal of moving the larger amount are both expressed in terms of number of intermediate accounts required to achieve the goal and number of time steps taken to achieve the goal on a plot, such as shown in visualization 530 discussed above. The overall monitoring strength against transferring 75000 is shown at reference 640, and the overall monitoring strength against transferring 100000 is shown at reference 645. In this example the user can tell at a glance that the number of intermediate accounts used does not change between the smaller and larger amounts, but shows that the larger amount takes longer to move. This confirms the intuition that moving larger amounts of money ought to take longer, and further gives an objective measurement of how much longer it does take to move the larger amount. This objective measurement was not possible for a computing device prior to the introduction of the systems, methods, and other embodiments herein.

In one embodiment, the outputs presented in GUI 600 include visualization(s) of the relative strength of scenario for both the transfer of the smaller amount and the transfer of the larger amount, such as example relative strength of scenario plot 650. The relative strengths of scenario for the smaller amount and larger amount are generated in a manner similar to that described above for example relative strength of scenario plot 555. In one embodiment, a set of relative strengths of scenarios for the smaller amount 655 are shown adjacent to a set of relative strengths of scenarios for the larger amount 660 in a bar chart, thereby facilitating comparison. This assists user understanding of the effects on individual scenarios of changing from a smaller amount to a larger amount to transfer. Both sets of relative strengths of scenarios are generated by a consistent process, the RL agent training, resulting in a consistent and objective analysis of relative strength of scenario regardless of transfer amount, an advantage not available without the systems, methods, and other embodiments herein.

In one embodiment, the outputs presented in GUI 600 include visualization(s) of the cumulative alerts per week for both the transfer of the smaller amount and the transfer of the larger amount, such as shown in example cumulative alerts per week plot 665. The cumulative alerts per week for both the smaller amount and larger amount are generated in a manner similar to that described above for example cumulative alerts per week plot 585. In one embodiment, cumulative alerts per week for the smaller amount 670 are shown adjacent to cumulative alerts per week for the larger amount 675 in a bar chart, thereby facilitating comparison. This assists user understanding of the change in alert burden caused by a change in amount to transfer. The RL agent training-based process for generating these cumulative alerts per week metrics results in in a consistent and objective estimates of cumulative alerts per week regardless of transfer amount, an advantage not available without the systems, methods, and other embodiments herein.

Other GUIs similar to GUIs 500 and 600 may be used to present other comparisons. Generally, a visualization of a first graph showing a first set of RL agent operations under a first condition may be shown adjacent to a visualization of a second graph showing a second set of RL agent operations under a second set of conditions, along with a plot of the overall monitoring strength, a chart of the relative strength of scenario, and cumulative alerts per week under both the first and second conditions serves to inform the user of the effect of the change between the first and second condition. These GUIs may be pages of UI 310, and include visualizations generated by monitoring system evaluator 360. For example, GUI 500 shows the effect of the change in conditions from having an untrained RL agent to having a trained RL agent perform the transfers. In another example, GUI 600 shows the effect of the change in conditions from a having a goal of transferring a relatively smaller amount (such as 75000) into a goal account to having a goal of transferring a relatively larger amount (such as 100000) into a goal account.

—Automated Scenario Threshold Tuning—

Scenario thresholds may be poorly tuned. The systems methods, and other embodiments described herein for using an RL agent for evaluation of monitoring systems enable automated identification and recommendation of tuning threshold values for scenarios. The data generated during the training run includes a set of transactions used by the RL agent to evade a current configuration of thresholds for the scenarios. Multiple alternative thresholds may then be tested on those base transactions to identify thresholds that are most effective against the RL-agent-generated set of transactions. The thresholds may then be presented as recommendations for user review and selection, and may be automatically implemented and deployed to the monitoring system.

Figure 7:
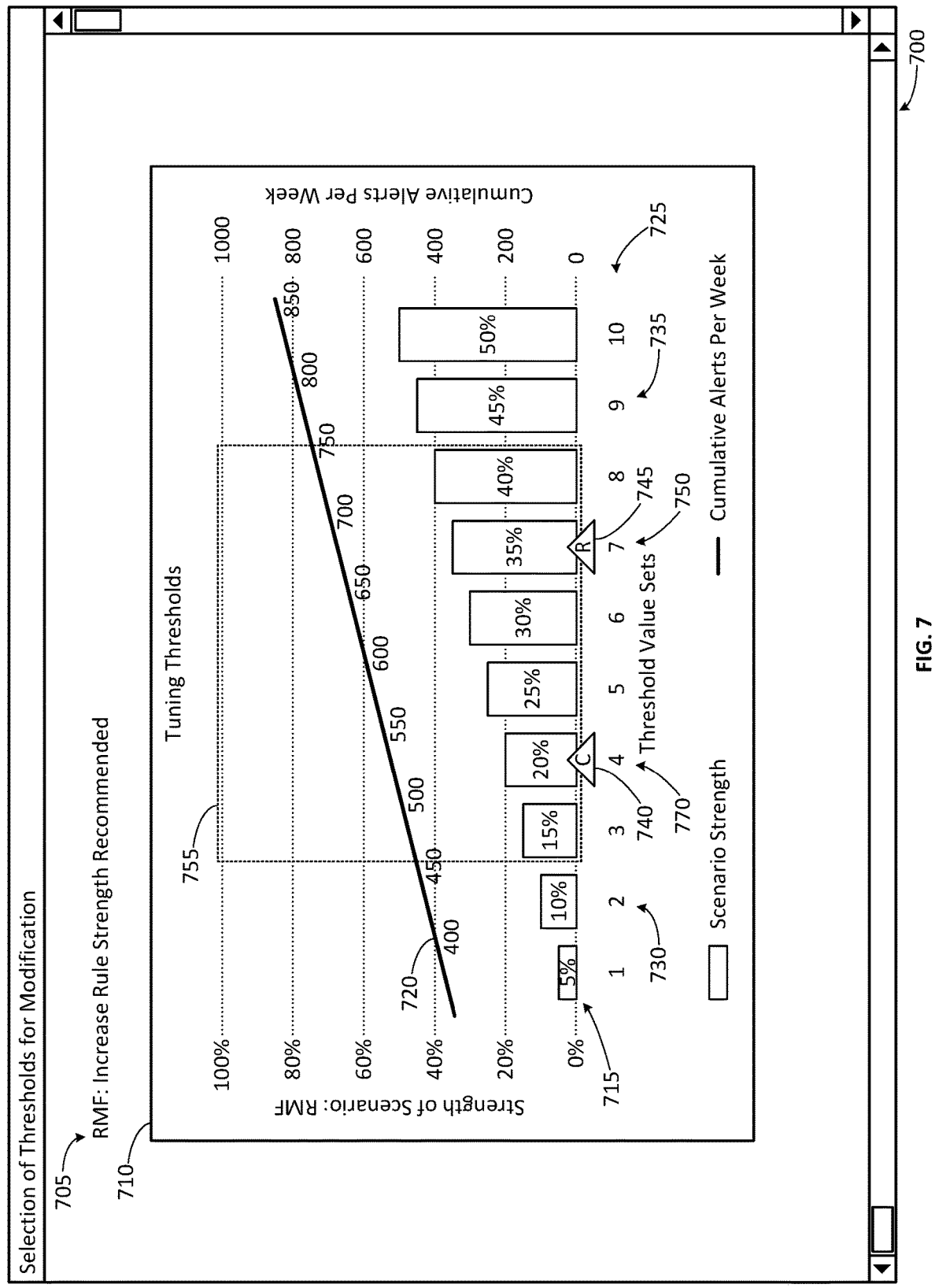
FIG. 7 illustrates one embodiment of a threshold tuning GUI associated with a reinforcement learning agent for evaluation of monitoring systems.

FIG. 7 illustrates one embodiment of a threshold tuning GUI 700 associated with a reinforcement learning agent for evaluation of monitoring systems. In one embodiment, the recommendations may be presented in threshold tuning GUI 700 for selection of tuning thresholds for modification 700. In one embodiment, GUI 700 includes an indication 705 of scenario that will be affected by the adjustment, and recommended direction (increase/decrease strength) of change. In one embodiment, GUI 700 includes a visualization 710 of tuning threshold information. In one embodiment, visualization 710 is generated by application 340 (for example by monitoring system evaluator 360) and GUI 700 is presented as a page of UI 310. Visualization 710 includes a plot of scenario strengths for the scenario to be adjusted 715 (in this case, RMF) and expected cumulative alerts per week 720 for various threshold value sets 725. In contrast to the relative scenario strengths discussed elsewhere herein that are expressed by the proportion of their contribution to overall alerting relative to other scenarios, scenario strengths 715 are absolute scenario strengths expressed as a proportion of actions in a set of actions that are intended to evade current scenario configurations (such as an optimal sequence identified by the RL agent) for which an alert is triggered. The threshold sets 725 include thresholds that cause the strength of the scenario to be adjusted to have the associated value shown, and result in the associated amount of cumulative alerts per week. For example, threshold set 2 730 includes a set of threshold values that causes the strength of the RMF scenario to be 10%, and cause the scenarios to generate approximately 425 cumulative alerts per week; while threshold set 9 735 causes the strength of the RMF scenario to be 45%, and cause the scenarios to generate approximately 775 cumulative alerts per week.

In one embodiment, a current threshold value set representing threshold values for scenarios as currently deployed in the monitoring system is shown by a current set indicator 740. In the example shown, current set indicator 740 indicates threshold value set 4. In one embodiment, a recommended threshold value set representing threshold values for scenarios as recommended for adjustment of scenario strength is shown by a recommended set indicator 745. In the example shown, recommended set indicator 745 indicates threshold value set 7.

In one embodiment, a "safe zone"—a range in which a scenario alerts with an acceptable level of sensitivity (for example, a range generally accepted by the applicable sector and/or compliant with applicable regulations)—is demarcated as a box 755 on the plot. Safe zone box 755 encloses threshold value sets that have an acceptable level of sensitivity, and excludes threshold value sets that do not conform to the acceptable level of sensitivity. In one embodiment, safe zone box 755 is dynamically generated to extend between pre-configured lower and upper bounds of the range, and exclude threshold value sets that have sensitivity that wholly or partially extends beyond the range.

In one embodiment, GUI 700 is configured to show individual values for the thresholds in a threshold value set, for example in response to user selection of (such as by mouse click on) any threshold value set 725, scenario strength 715, cumulative alert per week 720, current set indicator 740, or recommended set indicator 745. In one example, selection of recommended set indicator 745 would cause GUI 700 display of a table of threshold values for threshold value set 7 750, for example as shown in Table 3:

TABLE 2

Example Threshold Value Set

| Threshold | Value |
|---|---|
| Minimum Total Credit Amount | 0 |
| Maximum Total Credit Amount | 16000 |
| Minimum Total Credit Count | 1 |
| Maximum Total Credit Count | 20 |
| Minimum Total Debit Count | 1 |
| Maximum Total Debit Count | 20 |
| Minimum Percent | 10% |
| Minimum Total HRG Transaction Count Primary | 1 |
| Minimum Total HRG Transaction Amount Primary | 8000 |
| Minimum Total HRG Transaction Count Secondary | 1 |
| Minimum Total HRG Transaction Amount Secondary | 8000 |
| Minimum Percentage HRG Amount | 50% |
| Minimum Total HRG Transaction Amount Reference | 6000 |
| Minimum Total Cash Transaction Amount | 20000 |
| Minimum Total Cash Transaction Count | 2 |

In one embodiment, the GUI 700 includes threshold names, modifiable values for the thresholds, checkboxes or radio buttons to indicate that the threshold values is to be tightened, loosened, or automatically tightened or loosened, for example arranged in a table format. In one embodiment, GUI 700 includes a user-selectable option to choose a scenario to modify. In one embodiment, GUI 700 includes a user-selectable option to finalize changes made.

In one embodiment, the threshold value sets are determined automatically. For each scenario, the system generates an N-dimensional matrix or grid of possible threshold value sets, where N is the number of tunable parameters in the scenario. The system populates the matrix with values for each dimension, where the values are incremented along each dimension. The system retrieves the optimal sequence of actions learned by the RL agent to evade the scenarios. The system replaces the threshold values of a scenario applied to the RL agent's actions with a combination of the values in the matrix for the scenario. In one embodiment, the system replaces the threshold values with each unique combination in the matrix in turn. The system then applies the scenario as modified with the replaced thresholds to evaluate the optimal sequence of actions. The system records the number of alerts triggered by the optimal sequence for the modified scenario. In one embodiment, the system repeats application of the scenario as modified for each unique combination of threshold values to the optimal sequence of actions, and records the number of alerts generated. Combinations of threshold values that result in different numbers of alerts are identified. The combination that generates the most alerts is the most robust threshold for the scenario. The combination that generates the fewest alerts is the weakest threshold for the scenario. In one embodiment, the ranges of threshold values between the weakest and most robust thresholds is divided, partitioned, or binned into a number of evenly-spaced (equal) intervals, such as 10 intervals. The threshold values at the transition of each of these combinations form the threshold value sets for the scenario. In one embodiment, this process may be repeated for each scenario in order to generate threshold value sets for the overall set of scenarios.

In one embodiment, a recommended threshold value set is automatically determined based on a pre-determined range of strength for a scenario and a pre-determined range of cumulative alerts per week. In one embodiment, the system automatically selects the threshold value set with the highest strength of scenario that falls within the range of cumulative alerts per week. The recommended threshold may then be selected for further analysis as to its effectiveness, as discussed below.

Where a threshold value set stronger than the current threshold value set results in a number of cumulative alerts within the range of cumulative alerts, the system will automatically recommend strengthening the scenario, for example up to the strongest threshold value set that does not result in a number of cumulative alerts per week greater than the top of the range of cumulative alerts per week. In the example shown in GUI 700, a user may specify a strength range for a scenario between 15% and 40% (consistent with a safe zone 755 as discussed above), and a cumulative alerts per week range between 0 and 700. The system will therefore recommend increasing strength by replacing the threshold values with threshold value set 7 750, as shown by recommendation indicator 745. Threshold value set 7 750 is the strongest threshold value set—35% of transactions performed to evade current scenario configurations result in alerts—that does not cause more than 700 cumulative alerts per week. A scenario that does not produce a large number of alerts may thereby be automatically strengthened.

Where the threshold value set causes a number of cumulative alerts per week that is greater than the pre-determined range, the system will automatically recommend weakening the scenario, for example down to the strongest threshold value set that does not result in a number of cumulative alerts per week greater than the top of the range of cumulative alerts per week. For example, if the current threshold value set is threshold value set 7 750, and the maximum range of cumulative alerts per week is 550, the system will therefore recommend reducing scenario strength to threshold value set 4 760. In this way, a scenario with high relative importance that produces an excessive number of unproductive alerts may have its strength automatically reduced.

In one embodiment, a GUI displaying an impact of tuning threshold values of one or more scenarios may be presented. This can assist in determining appropriate tuning for threshold values. For example, a visualization showing a first graph of a first optimum transaction sequence performed by an RL agent to avoid scenarios configured with a first set of thresholds may be presented alongside a visualization showing a second graph of a second optimum transaction sequence performed by an RL agent to avoid the scenarios re-configured to use a second set of thresholds. In one embodiment, the second set of thresholds is automatically selected to be the recommended threshold value set as determined above. The difference between the first and second sets of thresholds may be a change in any one or more of the threshold values. Thus, a GUI may be configured to show the effect of the change in conditions from having the scenario thresholds configured with a first set of values to having the scenario thresholds configured with a second set of values.

For example, a comparison of relative scenario strengths for two threshold sets TS1 and TS2 may show that TS1 has a relatively low compliance strength (that is, a low overall monitoring strength). RMF is a relatively more complex scenario as compared to HRG and SigCash. A low relative strength of the RMF scenario may indicate that RMF contributes little to overall system effectiveness when configured with TS1. This suggests that the RMF scenario is not suitably tuned for the entity type being monitored. The same point—lack of tuning—may be suggested by a low transfer time and lower number of intermediate accounts used for TS1 as shown in a plot of overall monitoring strength. TS2 represents a tuning of the RMF thresholds. With TS2, the tuned the RMF results in an increase in overall system monitoring strength, as will be shown on a plot of overall monitoring strength, and the relative contribution of the RMF scenario will be much higher, consistent with expectations. Additional alerts will be generated following the tuning, as will be visible in a cumulative alerts per week (or other unit of time) chart.

In one embodiment, threshold tuning in response to increase in overall system strength may be automated. In one embodiment, scenarios in the monitoring system may be automatically reviewed for adjustment of tuning threshold values periodically (for example monthly) or in response to user initiation of a review. In one example, application 340 may analyze a monitoring system (using a training run for an RL agent to produce metrics, as discussed herein) with (i) a first configuration of threshold values for one or more scenarios that is consistent with a configuration of thresholds currently deployed to the monitoring system, for example in deployed scenarios 282; and (ii) a second configuration of threshold values for the one or more scenarios in which one or more threshold value is adjusted by a pre-determined increment. The performance of the monitoring system in both configurations is compared for overall monitoring strength, relative strengths of the scenarios, and cumulative alerts. In one embodiment, individual thresholds are adjusted one at a time, and performance evaluated individually following an adjustment. Where the performance metrics indicate that overall system strength improves while the number of alerts remains constant or decreases after an adjustment to a scenario, the adjustment is indicated to be deployed to the monitoring system.

In one embodiment, before proceeding to adjust a threshold of a scenario, application 340 is configured to present an option to automatically adjust the threshold for review and acceptance by the user. The option may take the form of a GUI for displaying an impact of tuning threshold values, as described above, and include a message recommending the threshold adjustment and a user selectable option (such as a mouse-selectable button) to accept or reject the proposed threshold adjustment. Where the automatic threshold adjustment is subject to user review, the adjustment will not proceed until accepted by the user (for example by selecting the accept option), and will be canceled or otherwise not performed if the user rejects the adjustment (for example by selecting the reject option. In this way, the scenarios in the monitored system are automatically modified in response to the determined strength.

—Scenario Redundancy and Decommissioning—

Scenarios may be redundant. The systems methods, and other embodiments described herein for using an RL agent for evaluation of monitoring systems enable detection and measurement of correlation between scenarios. Where a scenario rarely alerts in isolation and alerts mostly along with another scenario, it indicates that there is significant overlap in coverage (redundancy) between the two scenarios, suggesting one of the scenarios can be decommissioned. The extent of correlation between alerts of a first scenario and a second scenario may be derived from the record of a training run retrieved from database 315. In one embodiment, application 340 counts number of times during the training run that an alert for a first scenario occurs at the same time step as an alert for a second scenario, and divides that count by the total number of alerts for the first scenario over the course of the training run.

In one embodiment, a scenario overlap GUI displaying scenario correlation includes a table indicating an extent to which alerts of different types correlate to each other. Table 3 below indicates one example of correlation of alerts for an example training run of the RL agent in an environment with the following four scenarios: RMF, Significant Cash, HRG, and Anomaly in ATM.

TABLE 3

| Scenario Alert Correlation | | | | |
|---|---|---|---|---|
| | RMF | Sig. Cash | HRG | ATM Anom. |
| RMF | 1 | 0.2 | 0.24 | 0.3 |
| Sig. Cash | 0.2 | 1 | 0.18 | 0.9 |
| HRG | 0.24 | 0.18 | 1 | 0.08 |
| ATM Anom. | 0.3 | 0.9 | 0.08 | 1 |

In this example, ATM anomaly alerts occur at the same time as Sig. Cash alerts 90% of the time. This may exceed a pre-set correlation threshold (such as 85%) indicating redundancy between the scenarios. Where the correlation threshold is exceeded by a pair of scenarios, one of the redundant scenarios may therefore be indicated for decommissioning. In one embodiment, the weaker of the scenarios (as indicated by relative strength) will be evaluated for decommissioning. Accordingly, a relative strength of scenario chart may be included in the GUI.

In one embodiment, identification and selection of redundant scenarios to study for decommissioning is performed automatically. In one example, the identification and selection are performed in response to performance of an RL agent analysis of a monitored system. Application 340 determines extent of alert correlation between pairs of scenarios in the environment, determines whether the extent of alert correlation between any pair of scenarios exceeds a correlation threshold. Where a pair of scenarios is thus found to be excessively correlated, application 340 selects the scenario in the excessively correlated pair that is relatively weaker (or where the pair are of equal relative strength, selects either one of the scenarios in the pair) to be evaluated for decommissioning.

In one embodiment, before proceeding to evaluate the selected redundant scenario for decommissioning, application 340 is configured to present an option to proceed or not with the evaluation. The option may be included in the GUI displaying scenario correlation as a user-selectable option to proceed or not with the evaluation. Where the automatic evaluation is subject to user review, the evaluation will not proceed until accepted by the user, and will be canceled or otherwise not performed if the user indicates that the evaluation should not proceed.

In one embodiment, a decommissioning analysis GUI displaying an analysis of effect of decommissioning one or more scenarios, such as a redundant scenario, may be presented. This can assist in determining whether a scenario should be decommissioned and removed from the monitoring system. For example, a visualization showing a first graph of a first optimum transaction sequence performed by an RL agent to avoid a set of scenarios may be presented alongside a visualization showing a second graph of a second optimum transaction sequence performed by an RL agent to avoid the set of scenarios with a scenario removed or decommissioned. Thus, a GUI may be configured to show the effect of the change in conditions from having a scenario removed from the set of scenarios.

For example, a plot of overall monitoring strength is configured to show monitoring strength points before decommissioning a scenario and after decommissioning the scenario. A relative strength of scenario chart shows the relative strength of scenarios of the set of scenarios both before and after decommissioning and removal of one of the scenarios. A cumulative alerts per week chart shows the expected number of alerts generated both before and after decommissioning and removal of one of the scenarios. Where these metrics indicate that overall system strength improves or the number of alerts decrease after decommissioning of a scenario, the scenario is redundant, and decommissioning of the scenario is indicated.

In one embodiment, decommissioning the scenario in response to improved strength and/or reduction in the number of alerts may be automated. In one embodiment, scenarios in the monitoring system may be automatically reviewed for decommissioning periodically (for example monthly) or in response to user initiation of a review. For example, application 340 may analyze a monitoring system (using a training run for an RL agent to produce metrics, as discussed herein) both with and without a scenario that is under consideration for decommissioning or removal. In one embodiment, in response to a comparison indicating that (i) the overall strength improves beyond a pre-established threshold amount without the scenario, and (ii) the number of cumulative alerts decrease beyond a pre-established threshold amount, application 340 is configured to automatically decommission the scenario from the monitoring system, for example by removing it from deployed scenarios 282.

In one embodiment, before proceeding to decommission the scenario, application 340 is configured to present an option to automatically decommission the scenario from the monitored system for review and acceptance by the user. The option may take the form of a GUI displaying an analysis of effect of decommissioning the scenario, as described above, and further include a message recommending decommissioning the scenario, with a user-selectable option to accept or reject the decommissioning of the scenario. Where the automatic decommissioning is subject to user review, the decommissioning will not proceed until accepted by the user, and will be canceled if the user rejects it.

—Addition of New Channel or Product—

New transaction channels or account types (products) may be added to a monitored system. The systems methods, and other embodiments described herein for using an RL agent for evaluation of monitoring systems enable assessment of the impact of adding a new transaction channel or product to the monitored system. The action space and/or action space is updated to accommodate the new components.

In one embodiment, an example new component analysis GUI displaying an analysis of impact of adding a new channel to the monitored system may be presented. This can assist in showing whether scenarios need to be added or reconfigured to address the new channel. For example, a visualization showing a first graph of a first optimum transaction sequence performed by an RL agent to avoid a set of scenarios in an environment without the new transaction channel available may be presented alongside a visualization showing a second graph of a second optimum transaction sequence performed by an RL agent to avoid the set of scenarios with the new transaction channel available. Thus, a GUI may be configured to show the effect of the change in conditions from adding a new transaction channel to a monitored system.

In one example, an option to transfer through a new transaction channel, such as a peer-to-peer transaction channel like Zelle. This new channel is not monitored by scenarios, unlike the WIRE, MI, and CASH channels. Analyzing a monitored system that includes this unmonitored channel with the simulated money launderer (the RL agent) reveals that most transfers will be directed through the unmonitored new channel. The first graph shows actions of the RL agent in an environment that does not have the peer-to-peer transaction channel available. The first graph indicates that the RL agent performs all transfers using the monitored channels WIRE, MI, and CASH, in small amounts per transaction. The second graph shows actions of the RL agent in an environment that introduces an unmonitored peer-to-peer channel. The second graph illustrates a shift in focus by the RL agent to move most transactions through the unmonitored peer-to-peer channel directly from the initial account to the goal account, at a minimum of delay.

A plot of overall monitoring strength is configured to show monitoring strength points before and after introduction of the new, unmonitored channel. The plot will show the clear drop in intermediate accounts used and time taken to transfer money, a clear reduction in overall system strength. A relative strength of scenario chart shows the relative strength of scenarios of the set of scenarios both before and after introduction of the new, unmonitored channel. The relative strength of the scenarios becomes equal, as essentially no transactions are passed through them by the RL agent.

In this way, configuration of the environment also includes introducing one of (i) a new account type and (ii) a new transaction channel to the monitored system in the environment.

—Addition of Scenario to New Channel—

Scenarios may be added to a monitored system to monitor new or existing channels. The systems methods, and other embodiments described herein for using an RL agent for evaluation of monitoring systems enable assessment of the impact of adding a scenario to a new transaction channel in the monitored system. In one embodiment, the added scenario may be retrieved from a library of scenarios.

In one embodiment, a new channel GUI displaying an analysis of impact of adding a new channel to the monitored system may be presented. This can assist in showing whether a scenario added to the new channel corrects or resolves weak (or non-existent) monitoring of the new channel. For example, a visualization showing a first graph of a first optimum transaction sequence performed by an RL agent to avoid a set of scenarios in an environment that includes a new transaction channel that is unmonitored by a scenario may be presented alongside a visualization showing a second graph of a second optimum transaction sequence performed by an RL agent to avoid the set of scenarios with the new transaction channel both available and monitored by a scenario. Thus, a GUI may be configured to show the effect of the change in conditions from adding a scenario to monitor a new transaction channel in the monitored system.

In one example, an RMF scenario is added to the new peer-to-peer channel. The second graph will show the RL agent to make an initial transfer of the entire amount through the peer-to-peer channel to an internal intermediate account, and then from the intermediate account to transfer the entire amount in several smaller parts using the WIRE channel. This shows the RL agent's learned policy to evade the RMF monitoring of the peer-to-peer channel.

The metrics from the RL agent training are shown in a plot of overall monitoring strength, a relative strength of scenario chart, and a cumulative alerts per week chart. The plot of overall monitoring strength is configured to show monitoring strength points before and after introduction of the RMF scenario on the new peer-to-peer channel, and may also show a monitoring strength point for before the introduction of the new channel. In this example, the plot indicates increased overall monitoring strength over the unmonitored new channel, but decreased overall monitoring strength when compared with the system where the new channel is not included. A relative strength of scenario chart shows the relative strength of scenarios of the set of scenarios both before and after introduction of the RMF scenario to the new channel, and may further show relative strength of the scenarios before addition of the new channel. In this example, the relative strength without the new channel and with the new channel are as discussed above regarding addition of the new channel, and the relative strength of RMF increases over that of RMF without the addition of the new channel following addition of the RMF scenario to the new channel. A cumulative alerts per week chart shows a slight increase in cumulative alerts per week with the addition of RMF to the new channel.

In one embodiment, the new scenario, as configured with respect to threshold variables, is stored (and added to the step function) for subsequent application by the step function. In this way, configuration of environment 270, 330 also includes introducing an additional scenario to the monitored system in the environment.

—Product and Channel Coverage Analysis—

In one embodiment, the alerting information gathered over the course of a training run for the RL agent or alerts generated by sampling the policy learned by the trained agent enables explanatory breakdowns of scenario coverage by product type and by transaction channel type. In one embodiment, a scenario coverage GUI describing scenario coverage is presented through UI 310. Monitoring system evaluator 360 retrieves alerts triggered over the course of the training run, along with scenario type for the alerts and channel type for the transactions that triggered the alerts from database 315, and presents this information, for example as shown in Table 4:

TABLE 4

Scenario Coverage

PRODUCT COVERAGE

| | | Scenarios | | | |
|---|---|---|---|---|---|
| Product Type | No. of Alerts | RMF | HRG | ATM A | Sig. Ca |
| DDA | 418 | 15% | 65% | 10% | 10% |
| TRU | 194 | 25% | 40% | 0% | 35% |
| BRK | 225 | 37% | 23% | 0% | 40% |

CHANNEL COVERAGE

| | | Scenarios | | |
|---|---|---|---|---|
| Channel Type | No. of Alerts | RMF | HRG | Sig. Ca |
| Wire (international) | 888 | 30% | 70% | 0% |
| Wire (domestic) | 959 | 100% | 0% | 0% |
| Cash | 792 | 30% | 0% | 70% |
| Monetary Instr. | 910 | 100% | 0% | 0% |
| Peer-to-Peer | 696 | 50% | 25% | 25% |

Values given in Table 4 are illustrative examples. For each product type/channel, the GUI indicates the scenarios responsible for providing most coverage. For new product types, the GUI indicates the level of coverage provided by existing or new scenarios. Where coverage provided by a scenario over a channel or product is less than what is expected, it suggests thresholds need to be tuned.

—New Scenario Creation—

Overall system strength may be reduced due to addition of a new channel or product. The systems methods, and other embodiments described herein for using an RL agent for evaluation of monitoring systems enable creation of new scenarios responsive to addition of a new channel or product to the monitored system.

In one embodiment, a scenario creation GUI displaying a collection of predicates used in other scenarios may be presented. The predicates are user selectable for inclusion in a new scenario, for example by selecting a check box or other yes/no option adjacent to the predicate. In one embodiment, the predicates presented include those listed in Table 5:

TABLE 5

Selectable Predicates for New Scenario/Rule

Min Credit Amt New <= Total Credit Amount
Min Credit Ct New <= Total Credit Count
Min Debit Ct New <= Total Debit Count
Total Credit Amount × (1 − Min Percentage New/100) <= Total Debit Amount
Total Credit Amount <= Max Credit Amt New
Total Credit Count <= Max Credit Ct New
Total Debit Count <= Max Debit Ct New
Total Debit Amount <= Total Credit Amount × (1 + Min Percentage New/100)
Total amount of transactions in frequency period <= Min Total Trans Amt
Total number of transactions <= Min Trans Ct (Primary)
Total amount of transactions <= Min Trans Amt (Primary)
Total Amount of Cash Deposits/Withdrawals <= Min Trans Amt
Total Number of Cash Deposits/Withdrawals <= Min Trans Ct In one embodiment, a subset of the available predicates may be predictively highlighted as a recommended shortlist for inclusion in the new scenario. The selection of the subset is performed by machine learning trained on existing scenarios in a library of scenarios and application of the library scenarios to similar channels or products.

In one embodiment, the system presents recommended scenarios assembled from the recommended shortlist of predicates such as example recommended scenario "(Predicate) AND Predicate2) OR Predicate3 OR Predicate 4)" and example recommended scenario "(Predicate) OR Predicate2) AND Predicate 4)". The generation of the recommended scenarios is performed by machine learning trained on existing scenarios in a library of scenarios and application of the library scenarios to similar channels or products. In one embodiment, the user may custom-write a rule without using the list of available predicates.

In one embodiment, the system performs the analysis of overall monitoring strength for the current setup or configuration of scenarios, for each of the recommended scenarios, and for each custom-written scenario assembled by the user from predicates, enabling visual comparison (in a visualization of a plot of these data points) of overall monitoring strength by scenario configuration. Similarly, the cumulative alerts per week for each of the scenario configurations may also be presented in visualizations of bar charts comparing the various scenario configurations.

In one embodiment, the scenario creation GUI also accepts inputs to select one or more focuses of the new scenario, for example by selecting a check box or other yes/no option adjacent to the listed focus. In one embodiment, the listed focuses include customer, account, external entity, and correspondent bank.

—Example UI Interaction Flow—

Figure 8:
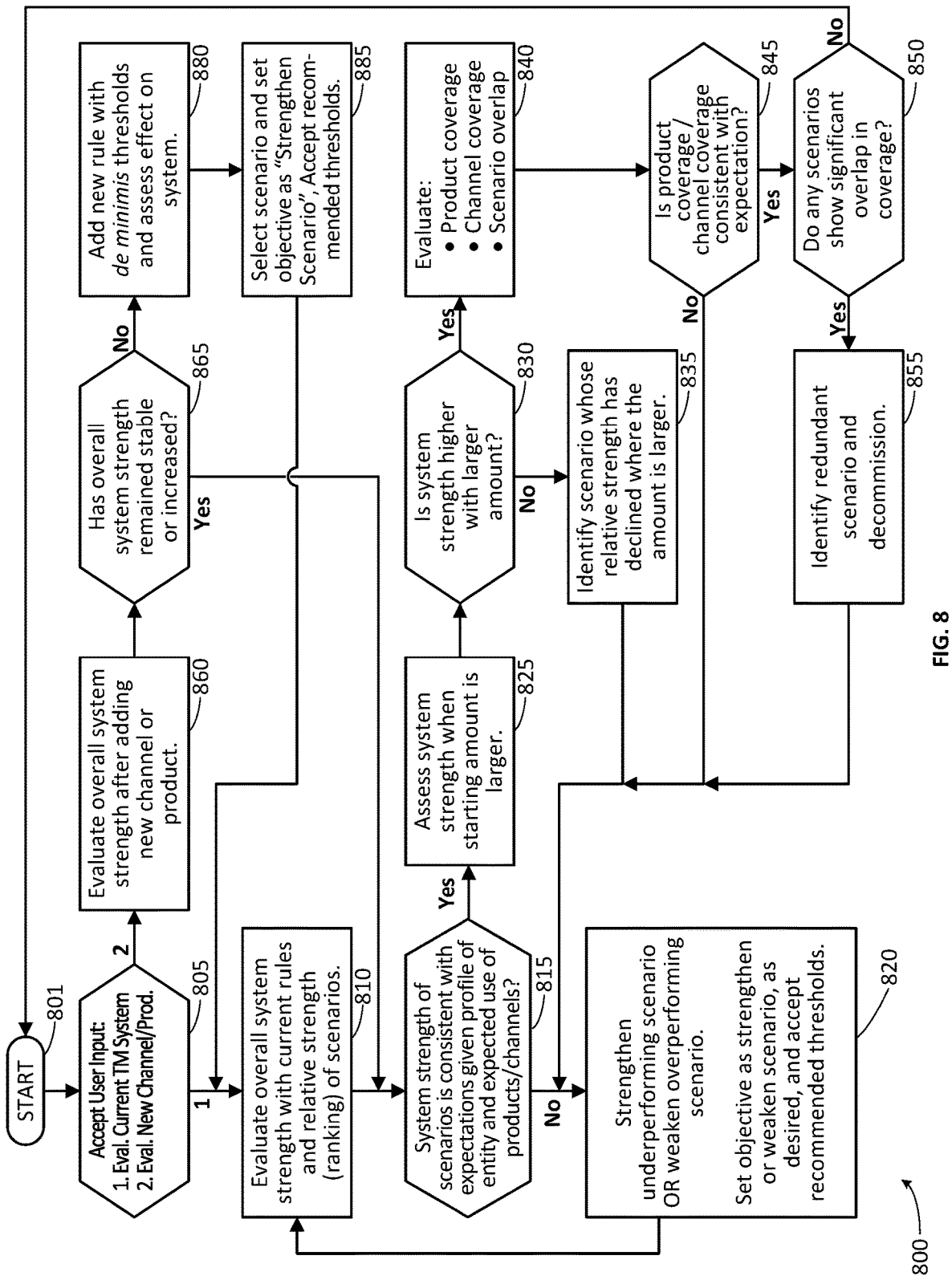
FIG. 8 illustrates an example interaction flow associated with a reinforcement learning agent for evaluation of monitoring systems.

In one embodiment, the user is presented with options to access the features described herein through UI 310. FIG. 8 illustrates an example interaction flow 800 associated with a reinforcement learning agent for evaluation of monitoring systems. Interaction flow begins at start block 801, and proceeds to a first UI page at decision block 805. The processor presents an option to either (1) evaluate a current transaction monitoring system or (2) evaluate the effect of a new channel or product, accepts the user's input in response, parses the input, and proceeds to a page responsive to the user's input.

Where the user has indicated evaluation of a current transaction monitoring system, the processor retrieves and presents an evaluation user interface page at process block 810. In one embodiment, evaluation user interface page is similar to the visual analysis GUI 500 shown and described with respect to FIG. 5. The processor automatically evaluates overall system strength with current rules and relative strength of scenarios, and presents the information in visualizations in the evaluation user interface page. From this information, at decision block 815, the user determines whether the presented system strength of scenarios is consistent with expectations given the profile of the monitored entity and the expected use of products and channels.

Where system strength is not as expected, the user may select an option to access a scenario tuning page at process block 820. In one embodiment, the scenario tuning page is similar to the tuning GUI 700 shown and described with respect to FIG. 7. On the scenario tuning page, the user may provide inputs to cause the processor to (i) strengthen underperforming scenarios, or (ii) weaken overperforming scenarios. The user may be provided with recommended threshold based on these inputs, and may provide further inputs to accept or reject implementation of the recommended thresholds. When the user completes using the scenario tuning page, the user may select to return to process block 810 to re-evaluate the overall system strength and relative scenario strength with the adjusted scenario thresholds.

Where the user determines at process block 815 that system strength is as expected, the user may select an option to access a scalability analysis page at process block 825. In one embodiment, the scenario scalability page is similar to the scenario scalability analysis GUI 600 shown and described with reference to FIG. 6. The processor automatically assesses system strength when the starting amount to be transferred to a goal account is larger than was analyzed at process block 810. From this information, at decision block 830, in one embodiment, the user determines whether system strength is or is not higher with the larger amount. In one embodiment, the system automatically determined whether system strength is or is not higher with the larger amount by comparison with the system strength value produced at process block 810.

Where the system strength is found to be not higher with the larger amount, at process block 835, the processor automatically identifies the scenario for which relative strength declined or reduced where the transferred amount is larger, for example by comparison of the relative scenario strengths generated at process block 810 and the relative scenario strengths generated at process block 825 to identify a scenario with reduced relative strength. In one embodiment, the identified scenario is presented to the user on the scenario scalability page. The processor then continues to process block 820, where the underperforming scenario is automatically strengthened.

Where the system strength is found at decision block 830 to be higher with the larger amount, at process block 840, the processor automatically proceeds to evaluate product coverage, channel coverage, and scenario overlap. The processor presents these metrics for review, for example in a scenario coverage GUI and a scenario overlap GUI as shown and described herein. From this information, at decision block 845, the user determines whether or not the product coverage and channel coverage by the scenarios are consistent with expectations. Where product coverage or channel coverage are not as expected, the user may select an option to access scenario tuning page at process block 820 to adjust scenario thresholds.

Where product coverage and channel coverage are consistent with expectations, the processor proceeds to automatically determine the extent to which scenarios show significant overlap in coverage. The processor may present this information for review in the scenario overlap GUI. From this information, at decision block 850, the processor automatically determines which, if any scenarios show significant overlap in coverage. If so, at process block 855, the processor automatically identifies the scenario with significant overlap in coverage to be redundant, presents information about the proposed decommissioning to the user on a decommissioning analysis GUI, and automatically decommissions the redundant scenario. The processor then continues to process block 820 to adjust any under or overperforming scenarios following the decommissioning.

Where the user has indicated evaluation of a new channel or product at decision block 805, the processor accepts user input specifying the new channel or product to be added, adds the new channel or product to the environment, and at process block 860, evaluates the overall system strength after adding the new channel or product. The processor retrieves and presents this information on a new component analysis page or GUI similar to GUIs 500 and 600.

At decision block 865, the processor automatically determines whether or not overall system strength has remained stable or increased following addition of the new channel or product, for example by comparing overall system strength values generated without and with the new channel/product. Where overall system strength has remained stable or increased, the processor proceeds to decision block 815 to allow the user to determine whether system strength is as expected. Where overall system strength has decreased following addition of the new channel or product, the processor proceeds to process block 870, where the processor solicits user inputs through a scenario creation GUI to add a new scenario or rule with minimal thresholds, and then automatically assesses the effect on the system.

The processor proceeds to process block 875, where the user is presented with a scenario tuning page. The processor accepts user inputs to select the new scenario and set the objective of the tuning to be strengthening the new scenario, automatically generates recommended thresholds, and accepts user inputs to accept the recommended thresholds. The processor then proceeds to process block 810 to re-evaluate the overall system strength and relative scenario strength with the new, tuned scenario in place.

—Example Method—

In one embodiment, each step of computer-implemented methods described herein may be performed by a processor (such as processor 1010 as shown and described with reference to FIG. 10) of one or more computing devices (i) accessing memory (such as memory 1015 and/or other computing device components shown and described with reference to FIG. 10) and (ii) configured with logic to cause the system to execute the step of the method (such as RL agent for evaluation of transaction monitoring systems logic 1030 shown and described with reference to FIG. 10). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 1015, or storage/disks 1035 of computing device 1005 or remote computers 1065 shown and described with reference to FIG. 10, or in data stores 230 shown and described with reference to FIG. 2).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 9:
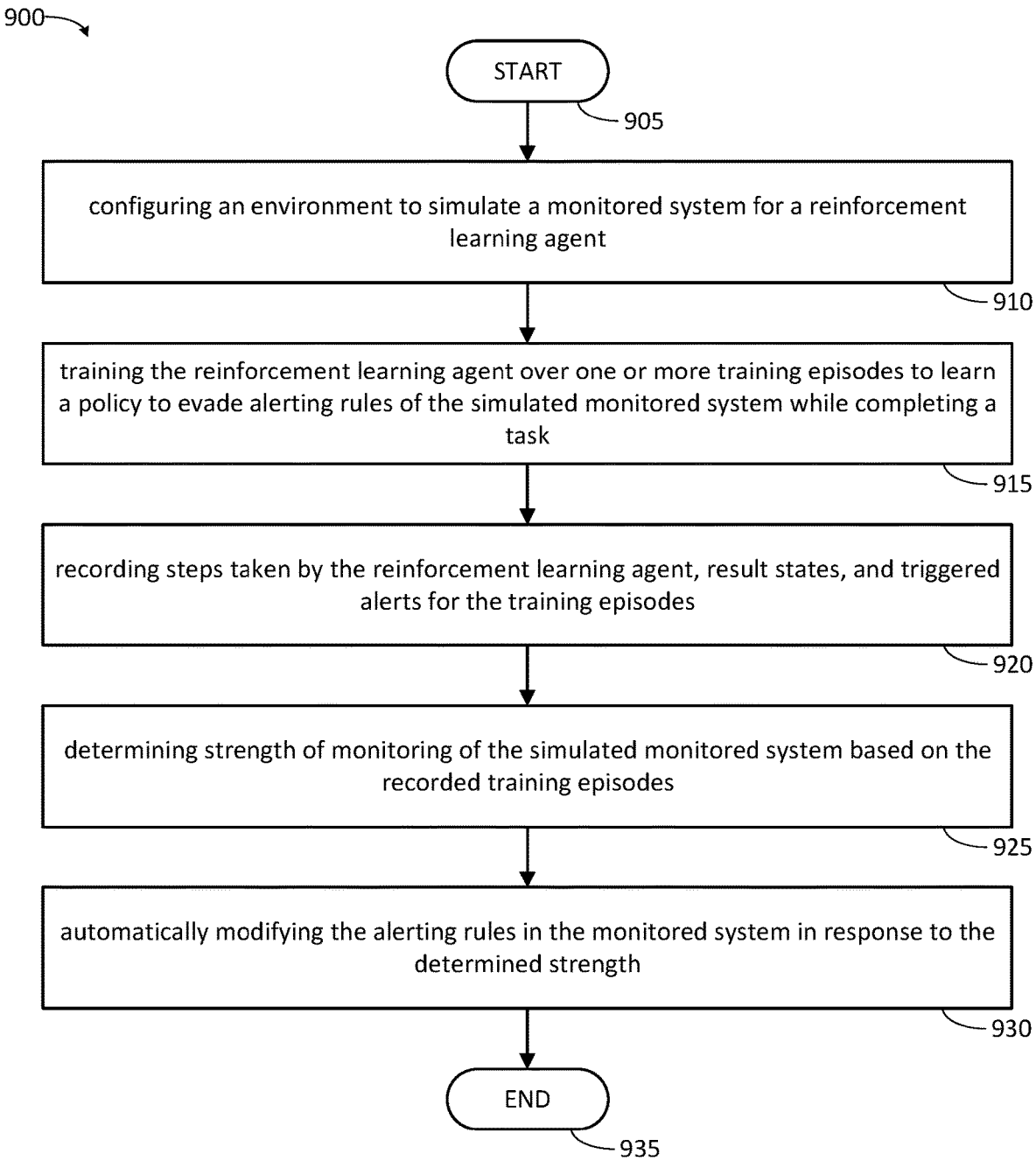
FIG. 9 illustrates one embodiment of a method associated with a reinforcement learning agent for evaluation of monitoring systems.

FIG. 9 illustrates one embodiment of a method 900 associated with a reinforcement learning agent for evaluation of monitoring systems. In one embodiment, the steps of method 900 are performed by reinforcement learning system components 220 (as shown and described with reference to FIG. 2. In one embodiment, reinforcement learning system components 220 are a special purpose computing device (such as computing device 1005) configured with RL agent for evaluation of transaction monitoring systems logic 1030. In one embodiment, reinforcement learning system components 220 is a module of a special purpose computing device configured with logic 1030. In one embodiment, real-time or near real-time, consistent (uniform), and non-subjective analysis of transaction monitoring system performance is enabled by the steps of method 900. Such analysis was not previously possible to be performed by computing devices without the use of step-by-step records of training of an adversarial RL agent as shown and described herein.

The method 900 may be initiated automatically based on various triggers, such as in response to receiving a signal over a network or parsing stored data indicating that (i) a user (or administrator) of monitoring system 205 has initiated method 900, (ii) that method 900 is scheduled to be initiated at defined times or time intervals, (iii) that an analysis of the performance of monitoring system scenario performance is requested, or (iv) an other trigger for beginning method 900 has occurred. The method 900 initiates at START block 905 in response to parsing a signal received or stored data retrieved and determining that the signal or stored data indicates that the method 900 should begin. Processing continues to process block 910.

At process block 910, the processor configures an environment to simulate a monitored system for a reinforcement learning agent, for example as shown and described herein.

In one embodiment the processor accepts inputs that define an action space—a set of all possible actions the RL agent can take—in the environment. In one embodiment, the inputs define a set of accounts in the environment, types of the accounts, an increment of available transaction sizes, a set of transaction channels available in the environment. In one embodiment, the processor parses configuration information of monitored system 225 to extract account types and transaction channel types in use in the monitored system. The processor then stores the definition of the action space for further use by the RL agent.

In one embodiment, the processor accepts inputs that define a state space—a set of all possible configurations—of the environment. In one embodiment, the processor parses scenarios deployed in the environment to determine the set of variables evaluated by the scenarios. The processor then generates the state space to include possible values for the variables, for example including in the state space all values (at a pre-set increment) for each variable within a pre-set range for the variable. The processor then stores the generated state space for further use by the RL agent.

In one embodiment, the processor accepts inputs that define a step function or process for transitioning from a time step to a subsequent time step. In one embodiment, the processor parses deployed scenarios 282 in monitored system 225 to identify and extract scenarios with threshold values configured as deployed in monitored system 225, and includes the extracted scenarios for evaluation during execution of the step function. In one embodiment, the processor receives and stores inputs that define a reward function to be applied during execution of the step function. The processor then stores the configured step function for later execution following actions by the RL agent.

In one embodiment, the processor accepts inputs that define a goal or task for execution by the RL agent. For example, the processor may receive and store inputs that indicate an amount for transfer, an initial or source account from which to move the amount, and a destination or goal account to which the amount is to be moved.

In one embodiment, a user may wish to evaluate the effect of adding a new product (such as a new account type or a new transaction channel) to the monitored system. Accordingly, this new product may also be included in the simulated monitored system of the environment by adding the account types or transaction channels to the state space of the environment. The modifications to the state space consistent with the new product may be specified by user inputs and effected in the environment during the configuration. Thus, in one embodiment, the configuration of the environment also includes introducing one of (i) a new account type and (ii) a new transaction channel to the monitored system in the environment, for example as shown and described herein.

In one embodiment, a user may wish to evaluate the effect of adding a new scenario to the monitored system. Accordingly, this new scenario may also be included in the simulated monitored system of the environment by adding the new scenario to the existing scenarios of the environment. The new scenario may be configured by user inputs and then applied during evaluation of steps taken by the RL agent. Thus, in one embodiment, the configuration of the environment also includes introducing an additional scenario to the monitored system in the environment, for example as shown and described herein.

Once the processor has thus completed configuring an environment to simulate a monitored system for a reinforcement learning agent, processing at process block 910 completes, and processing continues to process block 915.

At process block 915, the processor trains the reinforcement learning agent over one or more training episodes to learn a policy that evades scenarios of the simulated monitored system while completing a task, for example as shown and described herein.

In one embodiment, the processor provides a default, untrained, or naïve policy for the RL agent, for example retrieving the policy from storage and storing it as the initial learned policy 267 of adversarial RL agent 265. The policy maps a specific state to a specific action for the RL agent to take. The RL agent interacts with or explores the environment to determine the individual reward that it receives for taking a specific action from a specific state, and revises the policy episodically—for example, following each training episode—to optimize the total reward. The policy is revised towards optimal, for example by using reinforcement learning algorithms such as proximal policy optimization (PPO), to calculate values of state-action pairs for the state space and action space, and improving the policy by selecting the action with the maximum value given the current state.

In one embodiment, a training episode (or training iteration) ends when either (i) the task (such as transferring the designated funds into the designated account) is successfully completed, or (ii) length of the episode reaches a prescribed limit. In one embodiment, training of the reinforcement learning agent continues until a cutoff threshold or convergence criteria is satisfied that indicates that the reinforcement learning agent is successfully trained. For example, the reinforcement learning agent is trained through successive training iterations (each iteration comprising multiple episodes) until average reward in an iteration is consistently near or at a maximum possible reward value. Thus, in one embodiment, the processor trains the reinforcement learning agent through additional training episode(s) until the average reward converges on a maximum.

In one embodiment, to ensure that a training run completes within a reasonable time, a cap is placed on the number of training episodes or length of each episode. This causes the training run to complete in a pre-set maximum number of episodes, in the event that the reward function fails to converge before the cap on episodes is reached. The cap is a hyperparameter that may be set to a value higher than the expected number of episodes needed for convergence.

Convergence on the maximum reward may be determined by one or more successive training episodes with reward totals within a predetermined amount of the maximum possible reward value. For example, where the maximum possible score is 1, the processor may find the reinforcement learning agent to be successfully trained where the cumulative mean of the reward over the training episodes is greater than −1, with a standard deviation of less than 1. These convergence criteria indicates that the RL agent consistently avoids triggering alerts, and completes the assigned task with few steps. In one embodiment, the convergence criteria may be defined by the user, for example by providing them though user interface 310. Upon convergence (that is, once the convergence criteria are satisfied), the RL agent has explored sufficient sequences of decisions within the environment to know what sequence of decisions will produce an optimal reward and avoid triggering any scenarios.

In one embodiment, the processor calculates the reward for each episode, stores a record of the reward for each episode, calculates the cumulative mean of the rewards over the cumulative set of episodes, calculates the standard deviation of the rewards over the cumulative set of episodes, compares the cumulative mean to a cumulative mean threshold (such as a threshold of −1), compares the standard deviation to a standard deviation threshold (such as a threshold of 1), and determines whether the RL agent is successfully trained based on the two comparisons. In particular, where the cumulative mean exceeds the cumulative mean threshold and the standard deviation is less than the standard deviation threshold, the RL agent is determined to be successfully trained, and the training should cease iterating. Otherwise—where the cumulative mean is equal to or is less than the cumulative mean threshold or the standard deviation is equal to or greater than the standard deviation threshold—the RL agent is not determined to be successfully trained, and the training should continue through another iteration/episode.

In one embodiment, the reward function is based on (i) rewards for completing a task, (ii) penalties for steps taken to complete the task, and (iii) penalties for triggering alerts. In one embodiment, the reward function provides a reward, such as a reward of 1, for completing the task. In one embodiment, the reward function provides a small penalty (smaller than the reward, such as between 0.001 and 0.01) for each step taken towards completing the task. In one embodiment, the reward function provides a significant penalty (significantly larger than the reward, such as a penalty of 50 or 100) for each scenario triggered by an action. In one embodiment, the penalties further include a moderate penalty (for example, a penalty of 0.05) for any step taken that transfers an amount out of the goal or destination account, as such actions defeat the purpose of the RL agent.

Thus, in one embodiment, an episode of training of the reinforcement learning agent also includes, for a set of steps by the reinforcement learning agent: (i) rewarding the reinforcement learning agent with a reward where a step taken causes a result state in which the task is complete, (ii) penalizing the reinforcement learning agent with a small penalty less than the size of the reward where the step taken causes a result state in which the task is not complete and which does not trigger one of the scenarios, and (iii) penalizing the reinforcement learning agent with a large penalty larger than the reward.

In one embodiment, a cap is placed on training iterations, in order to prevent an endless (or excessively long) training period where the RL agent does not promptly converge on an optimal solution. The cap may be expressed in time or in iterations. The size of the cap is dependent on the size of the action space and state space in the environment. In a relatively simple example with 3 rules, 5 accounts, and 3 transaction channels, the RL agent converges on a cumulative mean reward of −0.96 within 50 iterations, and accordingly, a cap between 50 and 100 would be appropriate. The value of the cap, as well as other values such as the reward, the small step penalty, and the large alert penalty may be entered as user input before or during configuration.

In one embodiment, the processor determines whether the result state following an action by the RL agent triggers a scenario. In one embodiment, the processor parses the action of the step and result state of the step, and applies the scenario to the action and result state to determine whether or not the rule is triggered. Where a rule is triggered, the alert penalty is applied in the reward function. Multiple alerts may be triggered by an action and result state, and where multiple alerts are triggered, multiple alert penalties may be applied in the reward function.

In one embodiment, the monitored system is a financial transaction system and the task is transferring funds into a particular account. Accordingly, the scenarios are anti-money laundering (AML) rules. In one embodiment, following each action or step taken by the RL agent, the processor evaluates whether the result state triggers one or more AML rules. In one embodiment, the AML rules applied to the RL agent's actions are one or more of the following scenarios:

- rapid movement of funds (RMF)—a rule to identify transactions where funds are moved into and out of an account over a short period of time, such as in under 5 days;
- high-risk geography (HRG)—a rule to identify transactions involving countries and regions where money laundering is common, such as those with high drug trafficking or other criminal activity, high banking secrecy, or tax havens;
- significant cash (Sig_Cash)—a rule to identify cash transactions in excess of a threshold, such as deposits or withdrawals of more than $10,000 in cash; and
- Automated Teller Machine (ATM) anomaly—a rule to identify transactions using an ATM that are unusual compared with common or normal uses of an ATM.

In this way, where the monitored system is a financial transaction system and the task is transferring funds into a particular account, the method also includes evaluating whether the result state triggers one or more of a rapid movement of funds, high-risk geography, significant cash, or ATM anomaly scenario after a step taken by the reinforcement learning agent. The processor may also evaluate whether other AML rules are triggered. Examples of other AML rules that may be applied to the RL agent's actions include:

- suspicious spend behavior—a rule to identify transactions that deviate from an account holder's expected spending behavior based on income, occupation, education, or other factors;
- increased transaction values or volumes—a rule to identify unusually high pay-out transaction amounts or unusually high number of transactions compared to the account holder's usual behavior;
- structuring over time—a rule to detect an excessive proportion of transactions below a reporting threshold over a given period of time, for example, where 50% of transaction value over a 45-day window are of an amount that fall just short of a $10,000 threshold;
- circulation of funds (self-transfer)—a rule to detect account holder payments to other accounts or entities held by the same account holder;
- excessive flow-through behavior—a rule to detect where the total number of deposits and withdrawals are similar over a short period of time; and
- profile change before large transaction—a rule to detect account takeover or obscuring the ownership of funds by identifying account information changes shortly before a large transaction.

In one embodiment, the processor may apply any of the foregoing AML rules (or any other AML rules) meaningfully provided that the action space of the environment for the RL agent allows for actions that may trigger an alert under the AML rule. For example, if the action space does not allow the RL agent to change the profile of an account, the change profile change before large transaction rule is not meaningfully applied in the environment, and not effectively evaluated by the test.

Once the processor has thus completed training the reinforcement learning agent over one or more training episodes to learn a policy that evades scenarios of the simulated monitored system while completing a task, processing at process block 915 completes, and processing continues to process block 920.

At process block 920, the processor records steps taken by the reinforcement learning agent, result states, and triggered alerts for the training episodes, for example as shown and described herein.

In the process of exploration of steps within the environment to find a sequence of steps that produces an optimal reward and avoids triggering scenarios (for example as discussed in process block 915 above), the RL agent acts as a tool to measure how difficult it is to evade specific scenarios in the monitoring system. Accordingly, the steps of the RL agent's training episodes over a training run are recorded. In one embodiment, the recorded episodes of steps taken, result states, and triggered alerts is either (i) one of the training episodes, as stated above, or (ii) a simulated episode sampled from a policy learned by the trained reinforcement learning agent.

In one embodiment, recording of a step is performed contemporaneously with or immediately subsequent to the performance of the step, for example being provided by the processor in an ongoing data stream. In one embodiment, the steps are provided as a REST stream of objects (or a JSON stream of objects), where the objects describe the steps taken, the result states returned by the step function, and any alerts triggered. The processor parses the stream to identify the objects, and append them to database 315. Each step taken by the RL agent over the course of the training run is thus included in database 315.

Once the processor has thus completed recording the steps taken by the reinforcement learning agent, the result states, and the triggered alerts for the training (or simulated) episodes, processing at process block 920 completes, and processing continues to process block 925.

Additionally, the sequence of transactions or steps can be sampled randomly from the policy of the trained agent. This can be used in lieu of the sequences recorded during training of the agent. In one embodiment, recording of a step is performed in response to simulation of a step. In one embodiment, an episode (of one or more steps) is sampled from a policy learned by the RL agent over the course of training. The policy learned by the RL agent includes a probability distribution over a set of actions per state. An episode is a sequence of states and actions taken by the RL agent to achieve its goal (such as transferring funds between accounts without triggering an alert in a scenario). Once a policy for accomplishing its goal has been learned by the RL agent (that is, once the RL agent has been successfully trained), multiple simulated or generated episodes may be sampled from the policy without repeating the training process, for example as follows.

In one example, a first state (S0) is a state wherein an entire target amount to be transferred to a destination account is in an originating or initial account. This state (S0) is a beginning or initial state of a current episode. The processor samples an action from the probability distribution for the available actions for the current state. The processor then executes the sampled action and moves the agent to a new state. The processor appends the combination of sampled action and new state to the current episode. If, in the new state, the processor determines that (a) the entire target amount has been transferred to the destination account without triggering any scenario alerts, or (b) length of the episode (measured in time or number of steps elapsed) has exceeded a pre-specified threshold, the processor marks the current episode complete and stops the sampling process. If neither of these base conditions (a) or (b) have occurred, the processor repeats the process from the sampling step above until one of the base conditions occurs. In this way, the processor generates a simulated episode consistent with the learned policy.

At process block 925, the processor determines strength of monitoring of the simulated monitored system based on the recorded training episodes, for example as shown and described herein.

In one embodiment the processor parses through the record in database 315 of the training run to count a total number of times specific scenarios were alerted during the training run. Rule strength may be defined by the difficulty with which the RL agent evades the rule. Thus, the number of times a rule was triggered during the training run indicates how strong the rule is, and so is used as a proxy metric for rule strength. In one embodiment, the strength of the rule is expressed relative to the strengths of other rules active in the environment, for example as shown and described herein. This relative strength of scenario, as discussed in further detail herein, provides a first metric of the strength of monitoring.

Rule strength may also be defined by the time (expressed in steps) required to complete the goal in conjunction with the number of intermediate stops needed to complete the goal. Accordingly, in one embodiment, the processor (i) retrieves the number of steps taken to successfully transfer the amount in an optimal episode, and (ii) parses the recorded steps to determine the number of intermediate accounts used to transfer the money in the optimal episode. The tuple of these two values expresses an overall strength of monitoring that is not specifically attributed to any particular scenario. This overall monitoring strength, as discussed in further detail herein provides a second metric of the strength of monitoring.

Once the processor has thus completed determining strength of monitoring of the simulated monitored system based on the recorded training episodes, processing at process block 925 completes, and processing continues to process block 930.

At process block 930, the processor automatically modifies the scenarios in the monitored system in response to the determined strength, for example as described in further detail herein.

In one embodiment, the automatic modification of the scenarios is a change or adjustment to thresholds of existing rules, that is, of the scenarios that are already deployed and operating in the monitored system. In one embodiment, to adjust threshold values of the scenarios, the processor generates a set of possible values for a threshold value set. The processor retrieves an optimal sequence of actions by the RL agent (that is, an optimal training episode). The processor replaces the threshold values of the scenario applied in the optimal training episode with alternative threshold values drawn from the set of possible values for the threshold value set. The processor then applies the modified scenario to the optimal training episode, and records the number of alerts for the modified scenario in connection with the alternative threshold values applied in the modified scenario. The processor replaces the threshold values in the scenario and applies the newly modified scenario the optimal training episode repeatedly to identify a threshold value set that results in a highest number of alerts and identify a threshold value set that results in a lowest number of alerts. The processor partitions the range of values between the threshold values for the highest alerting scenario and lowest alerting scenario into a set of intervals. The processor automatically selects a threshold value division that has the strongest alerting but does not result in an excessive (beyond a pre-determined threshold number) amount of cumulative alerts to be the modified threshold values of the scenario.

Thus, as discussed above, the automatic modification of the scenarios also includes adjusting a threshold of an existing scenario based on strength of the adjusted scenario and a number of cumulative alerts resulting from the adjusted scenario, and deploying the adjusted scenario into the monitored system. For example, the processor automatically locates and replaces the existing scenario in deployed scenarios 282 with the adjusted scenario that has the modified threshold values.

In one embodiment, the automatic modification of the scenarios is a removal of a redundant scenario. A scenario may be considered "redundant" where the scenario's alerting is highly correlated with alerting of another scenario, as may be shown by the recorded learning activity of the RL agent. Thus, in one embodiment, the automatic modification of the scenarios also includes determining that an existing scenario in the simulated monitored system in the environment is redundant, and automatically removing the existing scenario from the monitored system in response to the determination that the existing rule is redundant, for example as discussed in further detail herein. In one embodiment, the processor identifies extent of correlation between alerts of different scenarios, compares the extent of correlation with a threshold indicating excessive correlation, and automatically decommissions and removes the redundant scenario from the monitored system.

—Automatic Modification of Transaction Constraints—

In one embodiment, in addition to (or in one embodiment, as an alternative to) automatic modification of the scenarios, the processor may automatically modify (or tune) transaction constraints for account types or transaction channels (also referred to as products) in the monitored system. In one embodiment, this automatic modification of transaction constraints may be performed for different customer segments (for example, customer segments of a bank or other financial institution). In one embodiment, this automatic modification of the transaction constraint includes adjusting a limit on a number or a cumulative amount for transactions involving an existing combination of account type and channel for a customer segment. For example, this adjustment and selection of segment may be based on an estimated chance of using that account type and/or channel for laundering. In one embodiment, this automatic modification of the transaction constraint includes deploying the adjusted constraints into the monitored system for application to the specific customer segment.

In one embodiment, a transaction constraint of a product may be modified and deployed as follows. A usage frequency (that is, a measure of how often a product is used) of a product in successful attempts to evade or circumvent scenarios in a simulation. Where the product is used more frequently than expected (based, for example on a preselected percentage threshold), the system will automatically tighten the transaction constraints (for example, a withdrawal limit) to make monitoring stronger. In one embodiment, the system automatically tightens the transaction constraints by generating a new or updated value for the transaction constraint. The generation of the new or updated value for the transaction constraint will perform an analysis and provide a specific suggestion of the extent to which the constraint value should change, and will show the impact of that change on the system's strength and the product's usage frequency. For example, the system will may automatically determine a new or updated value for the transaction constraint that, if applied, would cause the usage frequency to be at or below the expected level. The system will present new or updated value for the transaction constraint to the user (for example, in a GUI) for acceptance or rejection.

Once the processor has thus completed automatically modifying the scenarios in the monitored system in response to the determined strength, processing at process block 930 completes, and processing continues to END block 935, where process 900 ends.

—Selected Advantages—

In one embodiment, the reinforcement learning agent to evaluate transaction monitoring systems as shown and described herein enables the automatic identification of weaknesses or loopholes in the overall transaction monitoring system followed by automatic modification to remedy the identified weaknesses and close the identified loopholes. Prior solutions do not support this functionality.

In one embodiment, use of the RL agent to evaluate transaction monitoring systems as shown and described herein allows a user to determine the impact of introducing a new product by adding the product to the environment and assessing whether the adversarial agent can use this product to evade existing rules more easily (for example, in the AML context, to move money more easily) without actually deploying the rule into a live transaction environment. The user can then adjust existing rules or add new rules until, the RL agent is satisfactorily restrained by the rules or no longer able to evade rules using the product. This rule can then be directly and automatically deployed in production. Without the reinforcement learning agent to evaluate transaction monitoring systems as shown and described herein, a proposed rule must be piloted for an extensive period of time (for example, over 6 months), a large volume of suspicious activity alerts must be manually reviewed, and thresholds must be selected and the rule deployed in production. With the reinforcement learning agent to evaluate transaction monitoring systems as shown and described herein, the time taken to evaluate the effect of new products on the monitoring system is reduced from over 6 months to a few days.

In one embodiment, use of the RL agent to evaluate transaction monitoring systems allows the strength of the system to be tested against an entity that is actively trying to evade the system, rather than against entities that are simply moving money around and just happen to trigger the rule. This provides a far superior measure of the strength of individual rules and of overall system strength.

In one embodiment, use of the RL agent to evaluate transaction monitoring systems as shown and described herein enables more faithful quantification of the incremental value of a rule to the overall monitoring system. Without the reinforcement learning agent to evaluate transaction monitoring systems as shown and described herein, institutions have to quantify value of rules using just the effectiveness metric, which has attribution and other data issues as described elsewhere herein.

In one embodiment, use of the RL Agent to evaluate transaction monitoring systems as shown and described herein enables identification of specific account types or channels a money laundered might abuse. The system is further able to recommend changes to thresholds or recommend new scenarios that can plug these loopholes.

In one embodiment, use of the reinforcement learning agent to evaluate transaction monitoring systems as shown and described herein automatically develops a rule or policy for evading existing rules which can then be automatically implemented as a rule indicating suspicious activity in the transaction monitoring system.

The systems, methods, and other embodiments described herein can improve the functionality of Oracle Financial Services Crime and Compliance Management cloud service, NICE Actimize, SAS, FICO, Quantexa, Feedzai, and other software services used for financial crime prevention by introducing an adversarial RL agent that automatically evaluates the strength of monitoring rules and automatically adjusts scenario thresholds to close loopholes and thereby restrain or prevent malicious or criminal activity.

—Software Module Embodiments—

In general, computer-executable instructions such as software instructions are designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Cloud or Enterprise Embodiments—

In one embodiment, the present system (such as monitoring system 205) is a computing/data processing system including a computing application or collection of distributed computing applications for access and use by other client computing devices associated with an enterprise (such as the client computers 245, 250, 255, and 260 of enterprise network 215) that communicate with the present system over a network (such as network 210). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions.

—Computing Device Embodiments—

Figure 10:
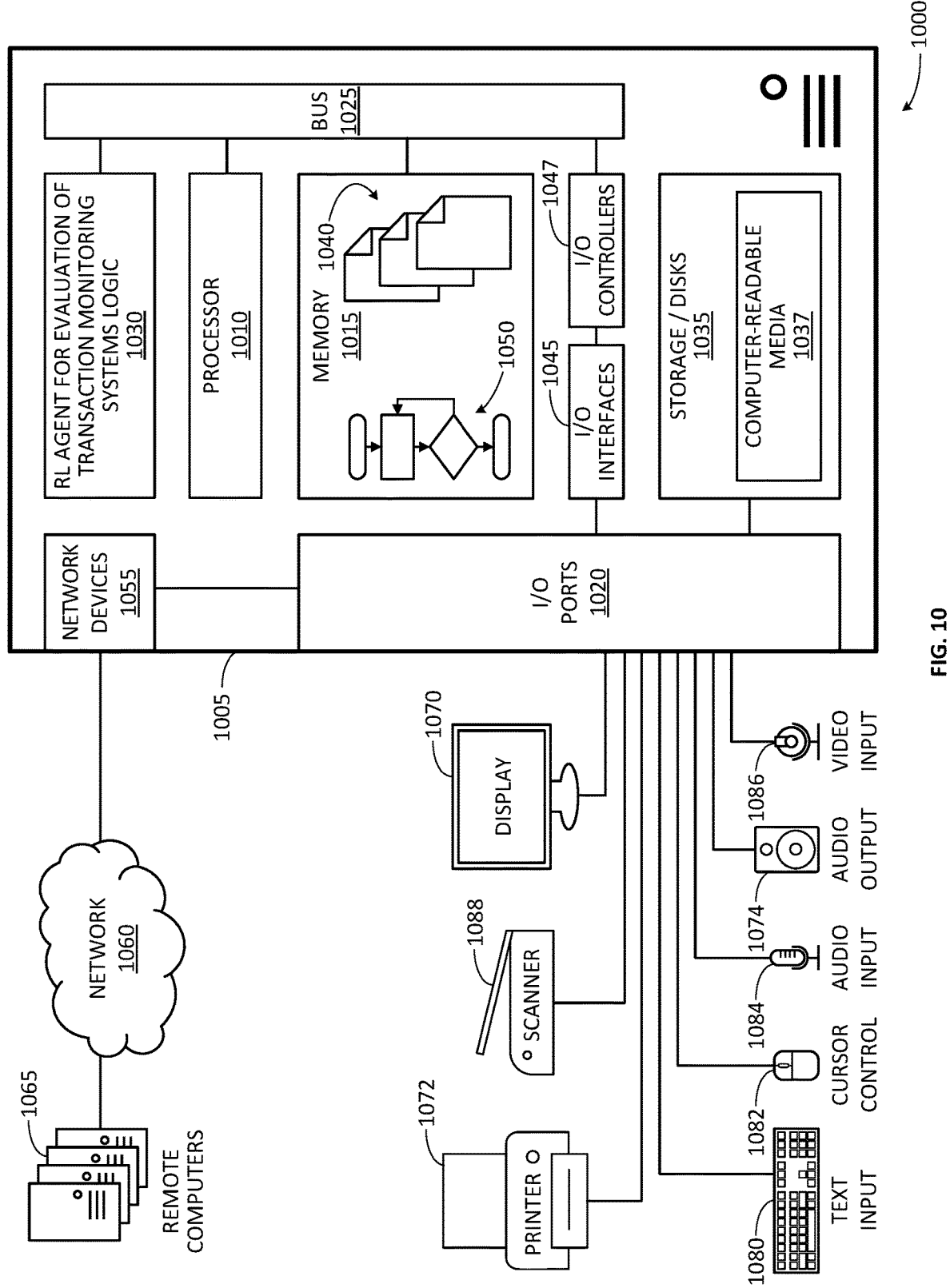
FIG. 10 illustrates an embodiment of a computing system configured with the example systems and/or methods disclosed.

FIG. 10 illustrates an example computing system 1000 that is configured and/or programmed as a special purpose computing device with one or more of the example systems and methods described herein, and/or equivalents. The example computing device may be a computer 1005 that includes a processor 1010, a memory 1015, and input/output ports 1020 operably connected by a bus 1025. In one example, the computer 1005 may include RL agent for evaluation of transaction monitoring systems logic 1030 configured to facilitate RL-agent-based evaluation of transaction monitoring systems similar to the logic, systems, and methods shown and described with reference to FIGS. 1-9. In one example, RL agent for evaluation of transaction monitoring systems logic 1030 is configured to facilitate automatic redundant scenario decommissioning systems, similar to the logic, systems, and methods shown and described with reference to FIG. 1. In different examples RL agent for evaluation of transaction monitoring systems logic 1030 may be implemented in hardware, a non-transitory computer-readable medium with stored instructions, firmware, and/or combinations thereof. While RL agent for evaluation of transaction monitoring systems logic 1030 is illustrated as a hardware component attached to the bus 1025, it is to be appreciated that in other embodiments, RL agent for evaluation of transaction monitoring systems logic 1030 could be implemented in the processor 1010, stored in memory 1015, or stored in disk 1035 on computer-readable media 1037.

In one embodiment, RL agent for evaluation of transaction monitoring systems logic 1030 or the computing system 1000 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform RL-agent-based evaluation of transaction monitoring systems. The means may also be implemented as stored computer executable instructions that are presented to computer 1005 as data 1040 that are temporarily stored in memory 1015 and then executed by processor 1010.

RL agent for evaluation of transaction monitoring systems logic 1030 may also provide means (e.g., hardware, non-transitory computer-readable medium that stores executable instructions, firmware) for performing RL-agent-based evaluation of transaction monitoring systems.

Generally describing an example configuration of the computer 1005, the processor 1010 may be a variety of various processors including dual microprocessor and other multi-processor architectures. A memory 1015 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1035 may be operably connected to the computer 1005 by way of, for example, an input/output (I/O) interface (for example, a card or device) 1045 and an input/output port 1020 that are controlled by at least an input/output (I/O) controller 1047. The disk 1035 may be, for example, a magnetic disk drive, a solid-state disk drive, a floppy disk drive, a tape drive, a Zip drive, a flash memory card, a memory stick, and so on. Furthermore, the disk 1035 may be a CD-ROM drive, a CD-R drive, a CD-RW drive, a DVD ROM, and so on. The memory 1015 can store a process 1050 and/or data 1040 formatted as one or more data structures, for example. The disk 1035 and/or the memory 1015 can store an operating system that controls and allocates resources of the computer 1005.

The computer 1005 may interact with, control, and/or be controlled by input/output (I/O) devices via the input/output (I/O) controller 1047, the I/O interfaces 1045 and the input/output ports 1020. The input/output devices include one or more displays 1070, printers 1072 (such as inkjet, laser, or 3D printers), and audio output devices 1074 (such as speakers or headphones), text input devices 1080 (such as keyboards), a pointing and selection device 1082 (such as mice, trackballs, touchpads, touch screens, joysticks, pointing sticks, stylus mice), audio input devices 1084 (such as microphones), video input devices 1086 (such as video and still cameras), scanners 1088, video cards (not shown), disk 1035, network devices 1055, and so on. The input/output ports 1020 may include, for example, serial ports, parallel ports, and USB ports.

The computer 1005 can operate in a network environment and thus may be connected to the network devices 1055 via the I/O interfaces 1045, and/or the I/O ports 1020. Through the network devices 1055, the computer 1005 may interact with a network 1060. Through the network 1060, the computer 1005 may be logically connected to remote computers 1065. Networks with which the computer 1005 may interact include, but are not limited to, a LAN, a WAN, a cloud, and other networks.

—Data Operations—

Data can be stored in memory by a write operation, which stores a data value in memory at a memory address. The write operation is generally: (1) use the processor to put a destination address into a memory address register; (2) use the processor to put a data value to be stored at the destination address into a memory data register; and (3) use the processor to copy the data from the memory data register to the memory cell indicated by the memory address register. Stored data can be retrieved from memory by a read operation, which retrieves the data value stored at the memory address. The read operation is generally: (1) use the processor to put a source address into the memory address register; and (2) use the processor to copy the data value currently stored at the source address into the memory data register. In practice, these operations are functions offered by separate software modules, for example as functions of an operating system. The specific operation of processor and memory for the read and write operations, and the appropriate commands for such operation will be understood and may be implemented by the skilled artisan.

Generally, in some embodiments, references to storage or storing indicate storage as a data structure in memory or storage/disks of a computing device (such as memory 1015, or storage/disks 1035 of computing device 1005 or remote computers 1065).

Further, in some embodiments, a database associated with the method may be included in memory. In a database, the storage and retrieval functions indicated may include the self-explanatory 'create,' 'read,' 'update,' or 'delete' data (CRUD) operations used in operating a database. These operations may be initiated by a query composed in the appropriate query language for the database. The specific form of these queries may differ based on the particular form of the database, and based on the query language for the database. For each interaction with a database described herein, the processor composes a query of the indicated database to perform the unique action described. If the query includes a 'read' operation, the data returned by executing the query on the database may be stored as a data structure in a data store, such as data store 230, or in memory.

—Definitions and Other Embodiments—

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
    training a reinforcement learning agent to learn an electronic policy data structure that maps states of an electronic transaction system to actions by the reinforcement learning agent that causes the reinforcement learning agent, when executed by one or more processors, to perform a task in the electronic transaction system without triggering an alert in scenarios of a monitoring system that are configured to hinder the task;
    during the training of the reinforcement learning agent, iteratively:
        (i) executing the reinforcement learning agent using the one or more processors to perform a transaction by the reinforcement learning agent that attempts to evade the scenarios of the monitoring system, wherein the reinforcement learning agent performs the transaction by:
            (a) electronically retrieving a current state of variables that are evaluated by the scenarios from a variables electronic data structure in memory,
            (b) electronically retrieving a mapping of the current state to the transaction from the electronic policy data structure, and
            (c) updating the current state of variables in the variables electronic data structure as indicated by the transaction;
        (ii) executing the scenarios by the monitoring system to evaluate whether the current state of variables triggers alerts under the scenarios,
        (iii) generating and storing electronic records of the transaction individually in a records electronic data structure in memory that includes values for type of transaction channel and alert statuses for the scenarios, and
        (iv) adjusting the electronic policy data structure to increase a reward function that provides a relatively larger penalty when one of the scenarios is triggered, a relatively smaller penalty for performing the transaction, and a reward for completing the task;
    determining a usage frequency for a transaction channel in a subset of the transactions in which the attempts to evade the one or more scenarios are successful based on transactions for the transaction channel that are recorded in the records electronic data structure with no alerts for the scenarios, wherein the usage frequency measures how often the reinforcement learning agent uses the transaction channel to successfully evade the scenarios;
    comparing the usage frequency to an expected usage frequency for the transaction channel;
    automatically modifying, in the scenarios, a transaction constraint on the transaction channel to prevent, by the transaction monitoring system, use of the transaction channel in a manner described by the electronic policy data structure;
    automatically deploying the transaction constraint into the scenarios that are used to monitor a live transaction environment; and
    monitoring the live transaction environment based on the transaction constraint.

2. The computer-implemented method of claim 1, wherein the modifying the transaction constraint further comprises:
    iteratively
        (i) generating a tightened transaction constraint on the transaction channel,
        (ii) determining an additional usage frequency for the tightened transaction constraint, and
        (iii) comparing the additional usage frequency to the expected usage frequency,
        until the additional usage frequency is at or below the expected usage frequency; and
    modifying the transaction constraint to match the tightened transaction constraint.

3. The computer-implemented method of claim 1, wherein the comparing the usage frequency to the expected usage frequency further comprises:
    determining an extent to which the usage frequency exceeds the expected usage frequency; and
    comparing the extent to a pre-selected threshold, wherein the modifying the transaction constraint on the transaction channel is performed in response to the extent satisfying the pre-selected threshold.

4. The computer-implemented method of claim 1, wherein the modifying the transaction constraint on the transaction channel further comprises instructing the monitoring system to apply the modified transaction constraint to live transactions or live accounts in a monitored system that is monitored by the monitoring system.

5. The computer-implemented method of claim 1, wherein the modifying the transaction constraint on the transaction channel further comprises instructing the monitoring system to apply the modified transaction constraint to live transactions or live accounts associated with a first customer segment, and to not apply the modified transaction constraint to live transactions or live accounts associated with a second customer segment.

6. The computer-implemented method of claim 1, further comprising:
    determining a new usage frequency for the transaction channel following the modification of the transaction constraint;
    presenting the new usage frequency for the transaction channel in a user interface;

presenting in the user interface a user-selectable element to accept the modifying the transaction constraint; and accepting in the user interface a user selection of the element to accept the modifying, wherein the modifying the transaction constraint is performed in response to the user selection.

7. The computer-implemented method of claim 1, wherein the modifying the transaction constraint further comprises reducing a size of amount permitted to be transferred through the transaction channel in a single transaction.

8. The computer-implemented method of claim 1, wherein the modifying the transaction constraint further comprises reducing a size of amount permitted to be transferred (i) into a type of account in a single transaction or (ii) out of the type of account in a single transaction.

9. A computing system comprising:
a processor;
a memory operably connected to the processor;
a non-transitory computer-readable medium operably connected to the processor and memory and storing computer-executable instructions that when executed by at least a processor of the computing system cause the computing system to:
train a reinforcement learning agent to learn an electronic policy data structure that maps states of an electronic transaction system to actions by the reinforcement learning agent that causes the reinforcement learning agent, when executed by one or more processors, to perform a task in the electronic transaction system without triggering an alert in scenarios of a monitoring system that are configured to hinder the task;
during the training of the reinforcement learning agent, iteratively:
(i) execute the reinforcement learning agent using the processor to perform a transaction by the reinforcement learning agent that attempts to evade the scenarios of the monitoring system, wherein the reinforcement learning agent performs the transaction by:
(a) electronically retrieving a current state of variables that are evaluated by the scenarios from a variables electronic data structure in memory,
(b) electronically retrieving a mapping of the current state to the transaction from the electronic policy data structure,
(c) updating the current state of variables in the variables electronic data structure as indicated by the transaction;
(ii) execute the scenarios by the monitoring system to evaluate whether the current state of variables triggers alerts under the scenarios,
(iii) generate and store electronic records of the transaction individually in a records electronic data structure in memory that includes values for type of transaction channel and alert statuses for the scenarios, and
(iv) adjust the electronic policy data structure to increase a reward function that provides a relatively larger penalty when one of the scenarios is triggered, a relatively smaller penalty for performing the transaction, and a reward for completing the task;
determine a usage frequency for a transaction channel in a subset of the transactions in which the attempts to evade the one or more scenarios are successful based on transactions for the transaction channel that are recorded in the records electronic data structure with no alerts for the scenarios, wherein the usage frequency measures how often the reinforcement learning agent uses the transaction channel to successfully evade the scenarios;
compare the usage frequency to an expected usage frequency for the transaction channel;
automatically modify, in the scenarios, a transaction constraint on the transaction channel to prevent, by the transaction monitoring system, use of the transaction channel in a manner described by the electronic policy data structure;
automatically deploy the transaction constraint into the scenarios that are used to monitor a live transaction environment; and
monitor the live transaction environment based on the transaction constraint.

10. The computing system of claim 9, wherein the instructions to automatically modify the transaction constraint further cause the computing system to:
iteratively
(i) generate a tightened transaction constraint on the transaction channel,
(ii) determine an additional usage frequency for the tightened transaction constraint, and
(iii) compare the additional usage frequency to the expected usage frequency,
until the additional usage frequency is at or below the expected usage frequency; and
modify the transaction constraint to match the tightened transaction constraint.

11. The computing system of claim 9, wherein the instructions to compare the usage frequency to the expected usage frequency further cause the computing system to:
determine an extent to which the usage frequency exceeds the expected usage frequency; and
compare the extent to a pre-selected threshold, wherein the modifying the transaction constraint on the transaction channel is performed in response to the extent satisfying the pre-selected threshold.

12. The computing system of claim 9, wherein the instructions to automatically modify the transaction constraint on the transaction channel further cause the computing system to instruct the monitoring system to apply the modified transaction constraint to live transactions or live accounts in a monitored system that is monitored by the monitoring system.

13. The computing system of claim 9, wherein the instructions further cause the computing system to:
present in a user interface a user-selectable element to accept the modifying the transaction constraint; and
accept in the user interface a user selection of the element to accept the modifying, wherein the modifying the transaction constraint is performed in response to the user selection.

14. The computing system of claim 9, wherein the instructions to automatically modify the transaction constraint further causes the computing system to one of (i) reduce a size of amount permitted to be transferred through a type of transaction channel; or (ii) reduce a size of amount permitted to be transferred into or out of a type of account.

15. A non-transitory computer-readable medium having stored thereon computer-executable instructions that, when executed by a processor accessing memory of a computer cause the computer to:

train a reinforcement learning agent to learn an electronic policy data structure that maps states of an electronic transaction system to actions by the reinforcement learning agent that causes the reinforcement learning agent, when executed by one or more processors, to perform a task in the electronic transaction system without triggering an alert in scenarios of a monitoring system that are configured to hinder the task;

during the training of the reinforcement learning agent, iteratively:
  (i) execute the reinforcement learning agent using the one or more processors to perform a transaction by the reinforcement learning agent that attempts to evade the scenarios of the monitoring system, wherein the reinforcement learning agent performs the transaction by:
    (a) electronically retrieving a current state of variables that are evaluated by the scenarios from a variables electronic data structure in memory,
    (b) electronically retrieving a mapping of the current state to the transaction from the electronic policy data structure, and
    (c) updating the current state of variables in the variables electronic data structure as indicated by the transaction;
  (ii) execute the scenarios by the monitoring system to evaluate whether the current state of variables triggers alerts under the scenarios,
  (iii) generating and storing electronic records of the transaction individually in a records electronic data structure in memory that includes values for type of transaction channel and alert statuses for the scenarios, and
  (iv) adjust the electronic policy data structure to increase a reward function that provides a relatively larger penalty when one of the scenarios is triggered, a relatively smaller penalty for performing the transaction, and a reward for completing the task;

determine a usage frequency for a transaction channel in a subset of the attempts to evade the one or more scenarios that are successful;

compare the usage frequency to an expected usage frequency for the transaction channel;

automatically modify, in the scenarios, a transaction constraint on the transaction channel to prevent, by the transaction monitoring system, use of the transaction channel in a manner described by the electronic policy data structure;

automatically deploy the transaction constraint into the scenarios that are used to monitor a live transaction environment; and monitor the live transaction environment based on the transaction constraint.

16. The non-transitory computer-readable medium of claim 15, wherein the instructions to automatically modify the transaction constraint further cause the computer to:
iteratively
  (i) generate a tightened transaction constraint on the transaction channel,
  (ii) determine an additional usage frequency for the tightened transaction constraint, and
  (iii) compare the additional usage frequency to the expected usage frequency,
  until the additional usage frequency is at or below the expected usage frequency; and
modify the transaction constraint to match the tightened transaction constraint.

17. The non-transitory computer-readable medium of claim 15, wherein the instructions to compare the usage frequency to the expected usage frequency further cause the computer to:
determine an extent to which the usage frequency exceeds the expected usage frequency; and
compare the extent to a pre-selected threshold, wherein the modifying the transaction constraint on the transaction channel is performed in response to the extent satisfying the pre-selected threshold.

18. The non-transitory computer-readable medium of claim 15, wherein the instructions to automatically modify the transaction constraint on the transaction channel further cause the computer to instruct the monitoring system to apply the modified transaction constraint to live transactions or live accounts in a monitored system that is monitored by the monitoring system.

19. The non-transitory computer-readable medium of claim 15, wherein the instructions further cause the computer to:
present in a user interface a user-selectable element to accept the modifying the transaction constraint; and
accept in the user interface a user selection of the element to accept the modifying, wherein the modifying the transaction constraint is performed in response to the user selection.

20. The non-transitory computer-readable medium of claim 15, wherein the instructions to automatically modify the transaction constraint further causes the computer to one of (i) reduce a size of cumulative amount permitted to be transferred through a type of transaction channel in a period of time; or (ii) reduce a size of cumulative amount permitted to be transferred into or out of a type of account in a period of time.

* * * * *